US007676791B2

(12) United States Patent
Hamby et al.

(10) Patent No.: US 7,676,791 B2
(45) Date of Patent: Mar. 9, 2010

(54) IMPLEMENTATION OF CONCURRENT PROGRAMS IN OBJECT-ORIENTED LANGUAGES

(75) Inventors: John L. Hamby, Issaquah, WA (US); Niklas Gustafsson, Bellevue, WA (US); Jason P. Allen, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1206 days.

(21) Appl. No.: 10/887,739

(22) Filed: Jul. 9, 2004

(65) Prior Publication Data

US 2006/0020446 A1 Jan. 26, 2006

(51) Int. Cl.
G06F 9/44 (2006.01)
G06F 9/46 (2006.01)

(52) U.S. Cl. ............... 717/116; 717/108; 719/314; 719/315; 719/317; 718/102

(58) Field of Classification Search ............... 717/116, 717/108
See application file for complete search history.

(56) References Cited

U.S. PATENT DOCUMENTS

| | | | |
|---|---|---|---|
| 5,389,838 A | 2/1995 | Orengo et al. | |
| 5,794,005 A * | 8/1998 | Steinman | 703/17 |
| 5,991,538 A * | 11/1999 | Becker | 717/140 |
| 5,999,987 A | 12/1999 | O'Farrell et al. | |
| 6,138,171 A * | 10/2000 | Walker | 719/318 |
| 6,167,423 A | 12/2000 | Chopra et al. | |
| 6,182,108 B1 | 1/2001 | Williams et al. | |
| 6,587,889 B1 | 7/2003 | Kaminsky | |
| 6,658,490 B1 | 12/2003 | Williams et al. | |
| 6,711,737 B1 * | 3/2004 | Okamura | 717/173 |
| 6,804,818 B1 * | 10/2004 | Codella et al. | 719/315 |
| 6,922,834 B1 * | 7/2005 | Okamura | 719/310 |
| 6,996,833 B1 * | 2/2006 | Olson et al. | 719/332 |
| 7,095,747 B2 * | 8/2006 | Sarmiento et al. | 370/401 |
| 7,159,211 B2 * | 1/2007 | Jalan et al. | 717/149 |
| 7,177,899 B2 * | 2/2007 | Ishibashi et al. | 709/201 |
| 7,191,450 B2 * | 3/2007 | Gilfix et al. | 719/313 |
| 7,240,054 B2 * | 7/2007 | Adiba et al. | 707/4 |
| 7,310,803 B2 * | 12/2007 | Haughey | 718/107 |
| 2002/0004850 A1 * | 1/2002 | Sudarshan et al. | 709/313 |

(Continued)

OTHER PUBLICATIONS

Szabolcs Ferenczi, "Parallel execution of object-oriented programs: Message handling strategies", available online Feb. 29, 1999, published by Elsevier Science B.V. p. 1-16.*

(Continued)

Primary Examiner—Michael J Yigdall
Assistant Examiner—Marina Lee
(74) Attorney, Agent, or Firm—Workman Nydegger

(57) ABSTRACT

The present invention adds support for concurrency to a mainstream object-oriented language. Language extensions are provided that can enable programs to be developed that can either be run in one address space, distributed across several process on a single computer, or distributed across a local-area or wide-area network, without recoding the program. Central to this aspect is the notion of a service, which can execute its own algorithmic (logical) thread. Services do not share memory or synchronize using explicit synchronization primitives. Rather, both data sharing and synchronization is accomplished via message-passing, e.g., a set of explicitly declared messages are sent between services. Messages can contain data that is shared, and the pattern of message exchange provide the necessary synchronization.

20 Claims, 8 Drawing Sheets

U.S. PATENT DOCUMENTS

| | | | |
|---|---|---|---|
| 2003/0014551 A1* | 1/2003 | Ishibashi et al. | 709/310 |
| 2003/0014733 A1* | 1/2003 | Ringseth et al. | 717/116 |
| 2003/0056024 A1* | 3/2003 | Tlaskal et al. | 709/315 |
| 2003/0204570 A1 | 10/2003 | Rehof et al. | |
| 2003/0204641 A1 | 10/2003 | Rehof et al. | |
| 2004/0064528 A1 | 4/2004 | Meredith et al. | |
| 2004/0064529 A1 | 4/2004 | Meredith et al. | |
| 2004/0158842 A1* | 8/2004 | Gilfix et al. | 719/328 |
| 2004/0167986 A1* | 8/2004 | Gilfix et al. | 709/230 |
| 2004/0172626 A1* | 9/2004 | Jalan et al. | 717/149 |

OTHER PUBLICATIONS

America et al. "A Parallel Object-Oriented Language with Inheritance and Subtyping", Jul. 12, 1990, ACM, pp. 1-8.*

Detmold, et al. Responsibilities: Support for Contract Based Distributed Programming. Australian Computer Science Communications, James Cook Univ Australia. vol. 18, No. 1, 1996, pp. 224-233, XP002461770.

Meyer. Eiffel: A Language and Environment for Software Engineering. Journal of Systems and Software, USA, vol. 8, No. 3, Jun. 1988, pp. 199-246, XP002461771.

Jan Van Den Bos, et al. PROCOL: A Parallel Object Language with Protocols. Sigplan Notices USA, vol. 24, No. 10, Oct. 1989, pp. 95-102.

Maruyama, et al. A Stream Based Parallel Object-Oriented Language A'UM-90. NEC Research and Development, Nippon Electric Ltd. vol. 33, No. 2, Apr. 1, 1992. pp. 246-253, XP00310835.

European Search Report for European Patent Application No. EP05106321 dated Jan. 16, 2008, 3 pages.

Cedric Fournet, et al., Stuck-Free Conformance, CAV 2004, Jul. 13-17, 2004, 13 pages, Springer-Verlag Heidelberg.

Tom Henzinger, Rich Interfaces for Software Modules, ECOOP 2004 Invited Talks, Jun. 14-18, 2004, 2 pages.

Concurrent Object-Oriented Programming, Communications of the ACM, Sep. 1990, pp. 125-141, vol. 33 No. 9.

Gregory R. Andrews, et al., Concepts and Notations for Concurrent Programming, Computing Surveys, Mar. 1983, pp. 3-43, vol. 15 No. 1.

Aaron W. Keen, et al., JR: Flexible Distributed Programming in an Extended Java, ACM Transactions on Programming Languages and Systems, May 2004, pp. 578-608, vol. 26 No. 3.

C. Huizing, et al., Full Abstraction of a Real-Time Denotational Semantics for an OCCAM-like Language, 1987, pp. 223-237.

Enno Scholz, Turning a Functional Data Type Into a Concurrent Programming Language, 1995, pp. 135-139, ACM.

Mani Chandy, et al., An Example of Stepwise Refinement of Distributed Programs: Quiescence Detection, ACM Transactions on Programming Languages and Systems, Jul. 1986, pp. 326-343, vol. 8 No. 3, ACM.

Ron Koymans, et al., Real-Time Programming and Asynchronous Message Passing, 1983, pp. 187-197, ACM.

Richard D. Schlichting, et al., Using Message Passing for Distributed Programming: Proof Rules and Disciplines, ACM Transactions on Programming Languages and Systems, Jul. 1984, pp. 402-431. vol. 6 No. 3. ACM.

Richard D. Schlichting, et al., Understanding and Using Asynchronous Message Passing, 1982, pp. 141-147, ACM.

* cited by examiner

IMPLEMENTATION OF CONCURRENT PROGRAMS IN OBJECT-ORIENTED LANGUAGES

TECHNICAL FIELD

This invention is related to generally to computer systems. More particularly, the present invention is directed to a system and methodology which can employ language extensions in an object oriented environment to support asynchronous programming through message passing, contracts, and orchestration.

BACKGROUND OF THE INVENTION

Programming concurrent applications is considered difficult and error-prone by a majority of professional developers. Most system developers struggle with this type of programming which is one reason why it remains outside the reach of most business application developers.

Concurrent algorithms are not always appropriate, however, when used for solving the right problems, they offer tremendous advantages in terms of performance and algorithmic simplicity. With the growing interest in developing programs that are distributed across wide-area networks, the need for concurrent programming tools is increasing as communication latencies grow rapidly and the cost of sequential execution sky-rockets.

One problem is, however, that the facilities for concurrency available to most programmers are low-level and complicated to use. Few programming languages offer any kind of support for concurrency. Conventionally, the programming languages that offer support for concurrency are special-purpose languages or languages that are used only within small academic communities.

Object-oriented (OO) frameworks such as J2EE and .NET brand environments have made the OO approach to program design mainstream. However, with its focus on shared memory, it leads to complex support for concurrency, support that is better suited for system programming than application programming. It is widely recognized that shared memory is one of the main obstacles to simple support for concurrency.

Accordingly, there exists a substantial need in the art to add support for concurrency to a mainstream OO language and to implement coexistence. Further, there is an unmet need for a system and/or method to allow programs to be developed that may either be run in one address space, distributed across several processes on a single computer, or distributed across a local-area or wide-area network, all without recoding the program. Central to this aspect is the notion of a "service", which executes its own algorithmic (logical) thread. Moreover, there is an unmet need for a means of specifying message-based interfaces between services. In other words, there is a need to unify OO and message oriented languages in order to simplify application programming.

Conventional services with message-passing are defined by OCCAM, a special-purpose language developed in the 1980's which was designed and operable only on a specific hardware processor. Formal program specifications embedded in the programming language are not new. Eiffel, for example, offers a limited form of program specification support directly in the programming language itself. Eiffel is an advanced programming language created by Bertrand Meyer and developed by his company, Interactive Software Engineering (ISE).

However, separation of the protocol specification from the implementation is currently not available. This separation is extremely important to the ability to abstract the interaction of services with each other. For example, XLANG, the language underlying BizTalk, exposes the entire service message-exchange pattern as a protocol. However, this implementation is not separated from the interface, which makes static verification of contract conformance difficult.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention disclosed and claimed herein, in one aspect thereof, provides a high-level abstraction of concurrency directly in a mainstream object-oriented (OO) language. It offers a concurrency model intended to make writing correct concurrent programs straightforward through the introduction of asynchronous message passing utilizing mechanisms for managing communication between multiple services simultaneously (e.g., orchestration).

In one aspect, the present invention adds support for concurrency to a mainstream object-oriented language. Language extensions are provided that can enable programs to be developed that can either be run in one address space, distributed across several process on a single computer, or distributed across a local-area or wide-area network, without recoding the program. Central to this aspect is the notion of a service, which can execute its own algorithmic (e.g., logical) thread. Accordingly, services do not share memory or synchronize using explicit synchronization primitives. Rather, both data sharing and synchronization is accomplished via message-passing, e.g., a set of explicitly declared messages are sent between services. Messages can contain data that is shared and the pattern of message exchange to provide the synchronization.

In another aspect, a methodology of specifying message-based interfaces between services is provided, e.g., a contract. A mechanism of adding further detail to interfaces (e.g., methods) and contracts is also provided. Such details offer the ability to describe an ordering of method calls (in the interface case) or messages (in the contract case) that can provide a formal protocol definition.

Other aspects of the present invention are directed to distinct contract-related innovations. Contracts are a formal specification of the allowable sequences of invocation of the members of an interface. They are particularly powerful when used with bidirectional message-based interfaces, but their applicability extends to traditional OO interfaces as discussed herein. By way of example, one aspect of the present invention is related to an implementation of a dynamic verification algorithm. More specifically, this aspect is related to a runtime algorithm for enforcement of contracts. Accordingly, regardless of the pattern of the expression, it is contemplated that the runtime representation can be a non-deterministic finite state machine encoding all legal contract states. This state machine can then be used to validate method invocations or messages against the contract specification.

Another aspect of the present invention is related to the introduction of explicitly declared messages in an OO language. While conventional systems employing message-oriented languages are known, the explicit declaration of directed, payload-carrying, messages is novel, as is its combination with OO concepts. Particularly, as discussed herein, the concept of message-passing is novel to OO languages, and quite distinct from the traditional concepts. Expressing a protocol as a set of methods or directed messages of temporal ordering of methods or messages is described according to another aspect. More particularly, this aspect of the innovation pertains to the addition of formal contracts to OO languages (e.g., VB.NET brand environment). By using the declared messages or methods as an alphabet of a pattern, one can establish a simple but sufficiently formal protocol definition of a communication protocol.

The contract concept can be augmented with a mechanism to achieve the same kind of software reuse as inheritance in relation to object-oriented languages. Particularly, one main concept is contract extension, whereby an asymmetrical compatibility between generations of contracts is achieved. By way of example, this concept enables a client using an older version of a contract to communicate with a service that has been updated to use a newer version.

Further, the present invention is directed toward orchestration. Accordingly, in order to handle the asynchronous needs of message-oriented programs, an aspect of the present invention adds language constructs that support several concepts of "safe" parallelism. Because the model is loosely coupled, it can support distribution of program components. Some of the benefits are programmer productivity in programming asynchronous applications, reliability of developed applications, and overall readability of application source code.

For ease of understanding, the described aspects of the present invention are directed to Visual Basic (VB) concepts related to the following keywords: Service, Send, Receive, Select Receive, Wait, Split, Timeout, Inner Services, Begin, Catch Receive, Accept, Split Select Receive. Combined, the new language construct can implement a model for handling messages in parallel with each other. It is contemplated that the present invention can support loosely coupled concurrency and co-routines for tightly coupled parallelism. These constructs are discussed in further detail later in this text.

A compilation algorithm can be utilized in accordance with aspects of the present invention. Specifically, the compiler's approach to breaking the co-routine-based code down into pieces to allow parallel waits to occur without blocking thread context is another novel aspect of the present invention. Each place in the source code that could potentially block the current thread while waiting for a message to arrive can be broken apart to allow multiple such points to wait in parallel, or alternatively, the thread context to continue with some other computation. To the accomplishment of the foregoing and related ends, certain illustrative aspects of the invention are described herein in connection with the following description and the annexed drawings. These aspects are indicative, however, of but a few of the various ways in which the principles of the invention can be employed and the present invention is intended to include all such aspects and their equivalents. Other advantages and novel features of the invention will become apparent from the following detailed description of the invention when considered in conjunction with the drawings.

Figure 1:
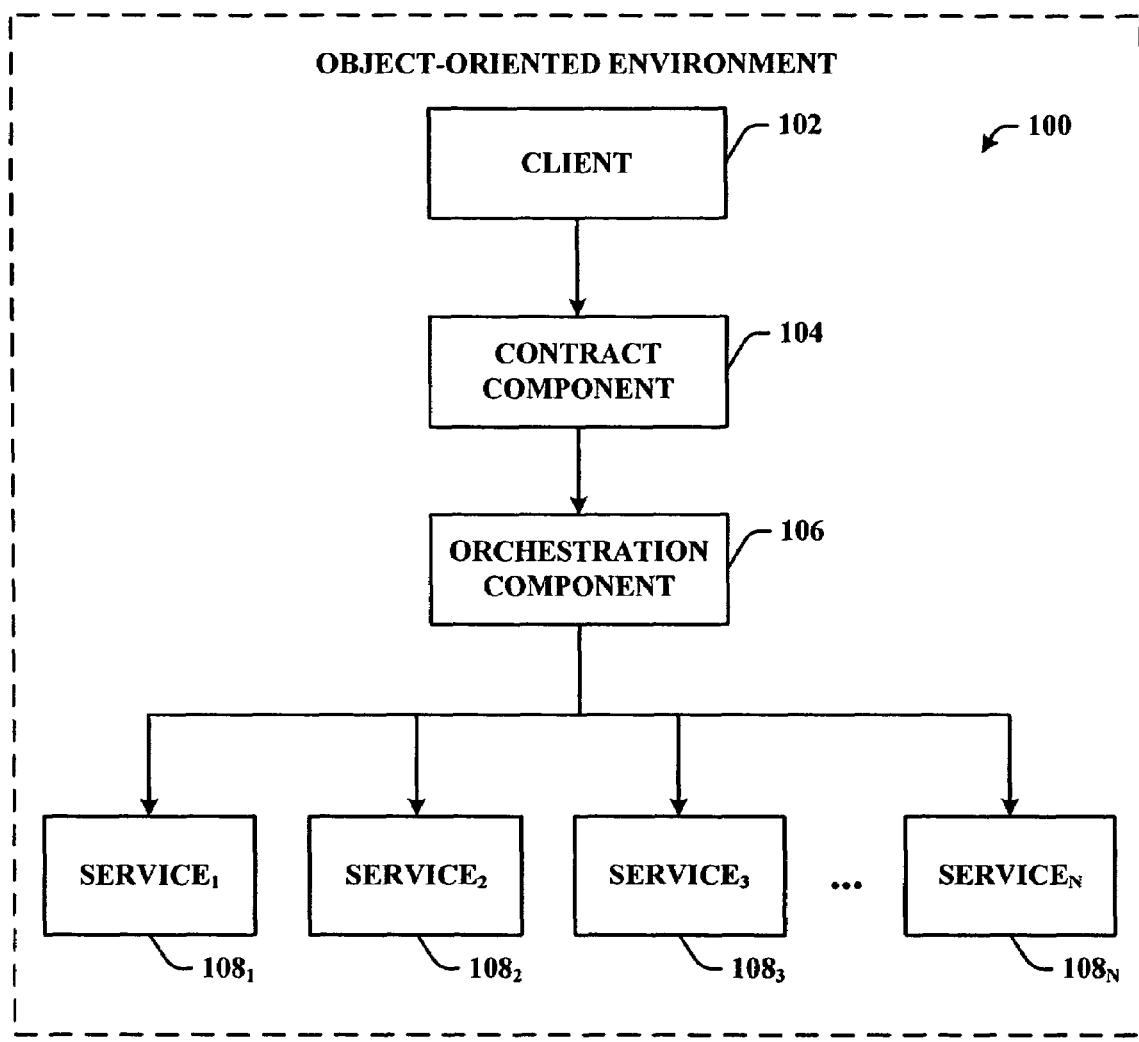
FIG. 1 illustrates a general component block diagram of a orchestration system in accordance with an aspect of the invention.

Appendix A is a paper entitled Stuck-Free Conformance. This appendix forms part of the subject specification.

DETAILED DESCRIPTION OF THE INVENTION

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention can be practiced without these specific details. In other instances, well-known structures and devices are shown in block diagram form in order to facilitate describing the present invention.

As used in this application, the terms "component", "system" and "mechanism" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Following is a description of various aspects of the present invention. It should be noted that although the present disclosure is discussed in relation to aspects employing the present system and method in a Visual Basic (VB) environment, it will be appreciated that the concepts disclosed herein can be employed in connection with any object oriented (OO) environment without departing from the spirit, scope or functionality of the present invention.

Generally, one aspect of the present invention is directed to a system and methodology which can employ language extensions in a VB.NET brand environment to support asynchronous programming through message passing, contracts, and orchestration. In short, in accordance with disclosed aspects of the present invention, VB orchestration allows one to describe a protocol and code a service or client accordingly. It will be appreciated that the present invention alleviates the need to explicitly code and manage conversational state.

Referring initially to FIG. 1, a general block diagram of an object-oriented system 100 in accordance with an aspect of the present invention is shown. As earlier stated, for ease of understanding, the system 100 will be described herein directed toward a VB application. Although the VB environment will be primarily used to discuss aspects of the invention, it is to be appreciated that the system 100 can be applied to any known object-oriented language without departing from the scope of the invention described herein. Generally, system 100 can be configured to include a client 102, a contract component 104, an orchestration component 106, and a plurality of target services $108_1$-$108_N$, where N is an integer. It will be appreciated that target services $108_1$-$108_N$ will be collectively referred to hereinafter as target services 108.

The contract component 104 can include a payload carrying message or set of messages and a protocol which identifies an implementation schedule for the message(s). It will be appreciated that the contract component can alternatively be directed to the transfer of methods or a set of methods.

Orchestration component 106 can be configured to interpret the contract and to facilitate parallelism and/or concurrency of services 108. For example, the orchestration component 106 can be configured facilitate the handling of multiple messages as well as multiple targets of a message(s). Although novel to the invention, it will be appreciated that the orchestration component of FIG. 1 enhances the underlying novel concepts and innovations of unifying object-oriented and message-oriented environments via message passing to/from services.

Figure 2:
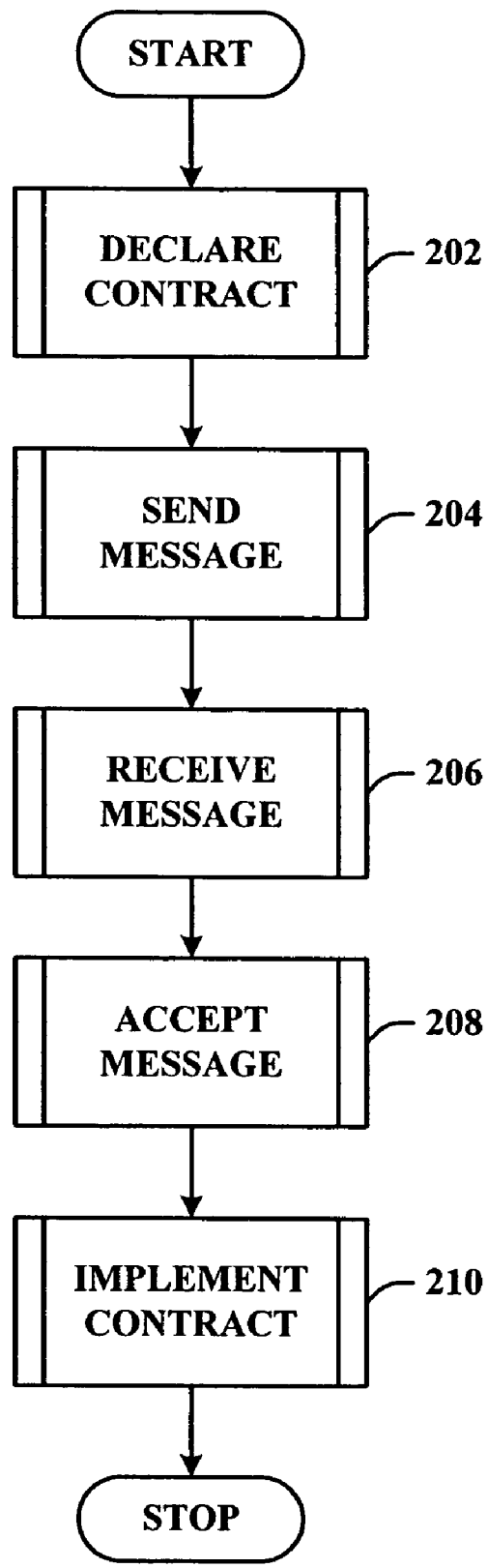
FIG. 2 illustrates a flow chart of procedures to facilitate message passing in an object-oriented environment in accordance with an aspect of the disclosed invention.

FIG. 2 illustrates a methodology for exchanging contracts and messages in accordance with an aspect of the present invention. While, for purposes of simplicity of explanation, the one or more methodologies shown herein, e.g., in the form of a flow chart, are shown and described as a series of acts, it is to be understood and appreciated that the present invention is not limited by the order of acts, as some acts may, in accordance with the present invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

At 202, a contract is declared—as described herein, it will be appreciated that declaration of the contract can include defining a plurality of messages or methods as well as an optional pattern of deployment. At 204, the message (or methods) embodied within the contract is sent to a target service. Next, at 206, the message (or methods) is received and transition is provoked. Finally, the message is accepted at 208 and subsequently decompiled at 210 in order to implement the contract and to employ the code included within its message(s) and/or method(s).

Concurrency Model

Referring again to FIG. 1, it should be noted that the concurrent execution with shared state between the client 102 and services 108 has proven to be problematic for even skilled programmers. While various forces push and pull software towards concurrent execution and asynchronous interaction between the client 102 and services 108, difficulties in achieving correctness are impediments. The present invention is directed to a system and/or methodology that employs a concurrency model to mitigate some of the complexities in writing correct concurrent programs.

Contrary to conventional implementations, in the exemplary VB orchestration of the present invention illustrated in FIG. 1, no two lines of execution that share in-memory state execute concurrently. As illustrated, the present invention employs the services 108 to facilitate concurrent execution. The services do not share state with any code outside of the individual service. Additionally, to accomplish asynchronous communication, the present system illustrated in FIG. 1 utilizes a contract component 104 or "message passing" technique, which appears in the language as explicit Send and Receive operations and embodied within the orchestration component 106.

It will be appreciated that the introduction of asynchronous message passing requires mechanisms for managing communication between multiple services simultaneously. Accordingly, the collection of mechanisms for coordinating communication between concurrent services is termed "orchestration" and employed by the orchestration component 106 of FIG. 1.

As will be discussed in further detail below, language mechanisms are provided that introduce pseudo-parallel execution (e.g., Split). However, these mechanisms actually provide concurrent waiting rather than concurrent execution. The combination of the services 108 and orchestration component 106 provides concurrent and asynchronous behavior without the risks of race conditions and unsynchronized memory accesses. In accordance with the present invention, an exchange of messages between two services occurs as a conversation governed by the contract component 104. Contract component 104 provides specifications of the messaging behaviors of services 108, and allows an individual service 108 to be checked for some forms of correctness (e.g., conformance with patterns of message exchange, freedom from deadlock) without access to the implementations of the services with which it interacts. Thus, it will be appreciated that a primary artifact in understanding the behavior of a service is its implemented contract.

Contracts

Figure 3:
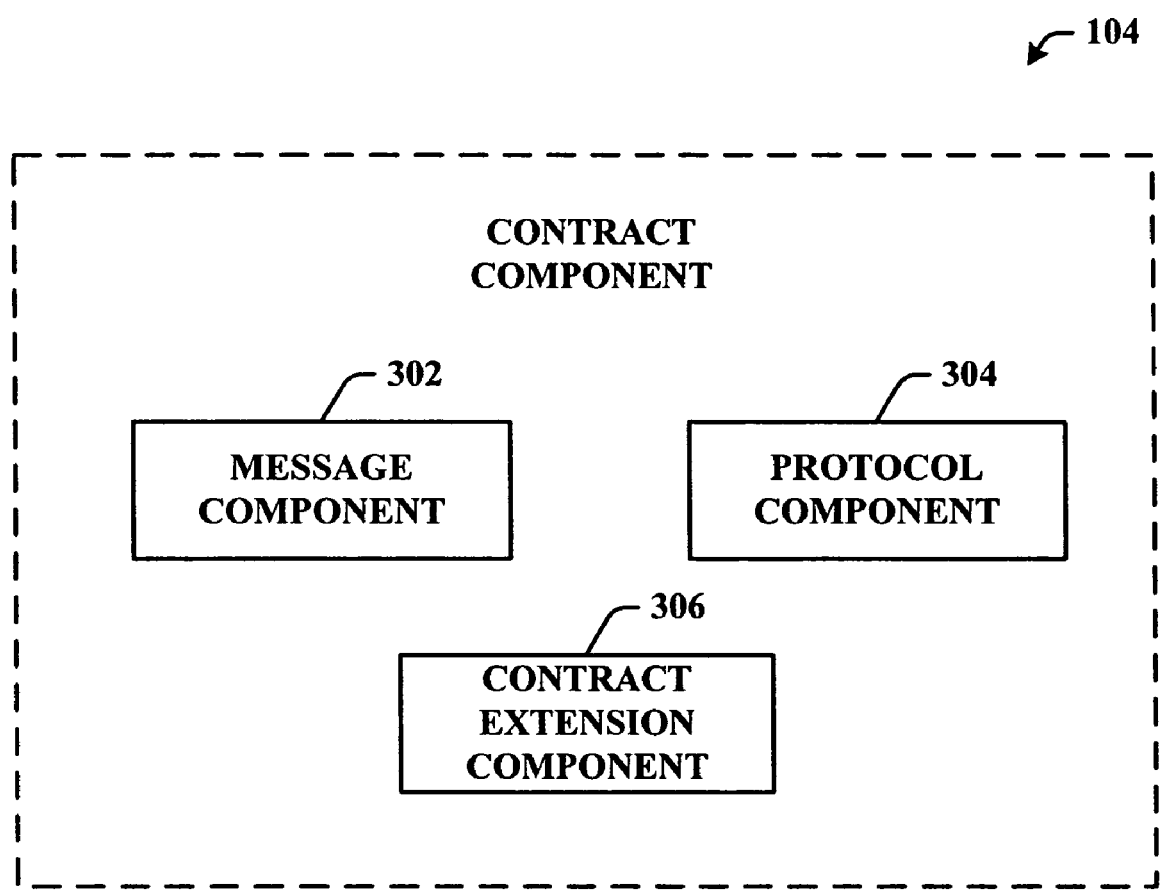
FIG. 3 illustrates a general component block diagram of a contract component in accordance with an aspect of the invention.

With reference to FIG. 3, essentially, a contract 104 can be defined as interface declarations for asynchronous message-passing, with richer semantics. In other words, a contract utilizing a message component 302 to specify a set of messages (or methods) and an optional protocol or pattern component 304 that describes allowable sequences of message exchange. Additionally, contract component 104 can employ a contract extension component 306 that extends an existing contract component.

Figure 4:
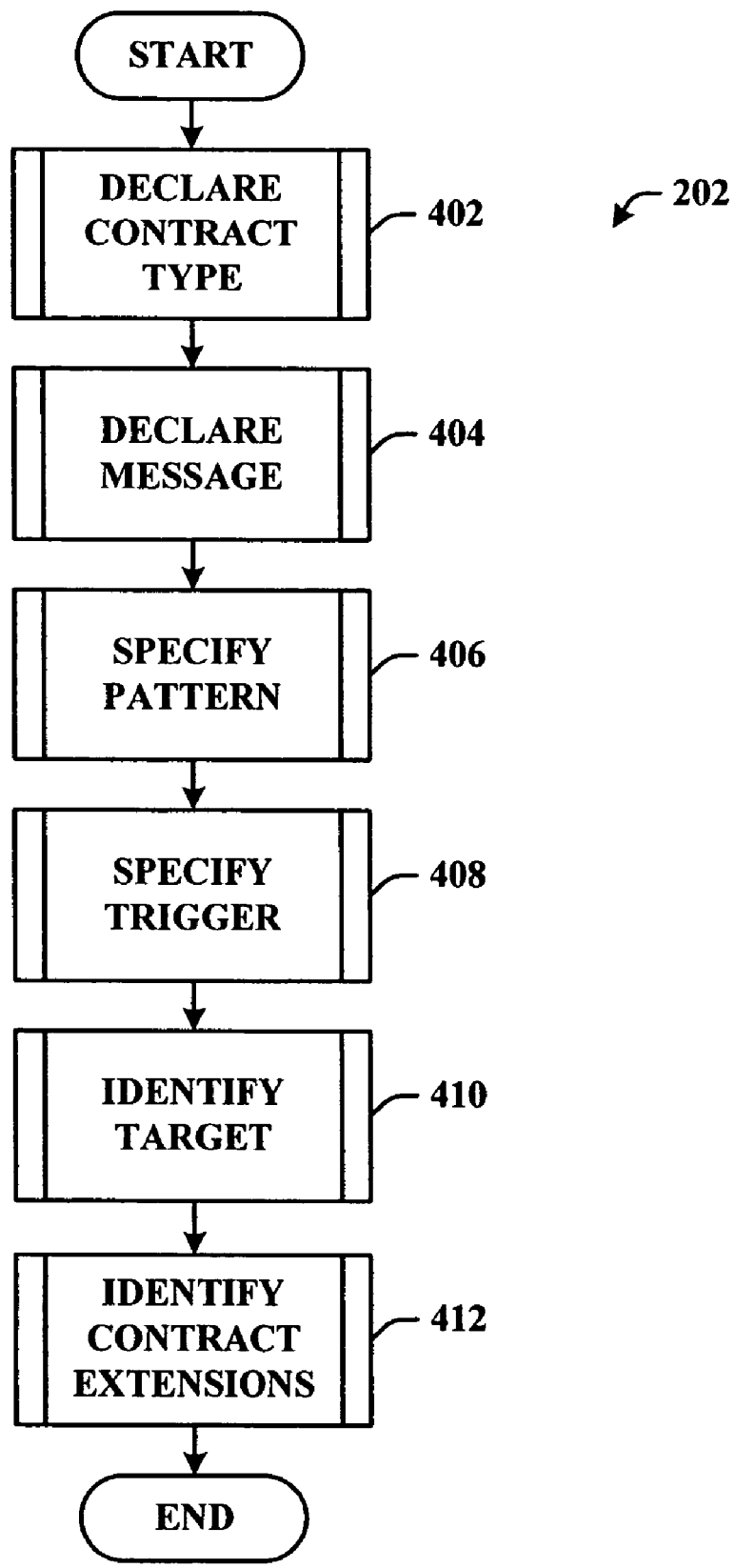
FIG. 4 illustrates a flow chart of procedures to facilitate the declaration of a contract in accordance with an aspect of the disclosed invention.

FIG. 4 illustrates a methodology 202 for declaring a contract in accordance with various aspects of the present invention. As described herein, it will be appreciated that declaration of the contract can include defining a plurality of messages or methods as well as an optional pattern. Referring to FIG. 4, and proceeding to 402, a contract type is declared. Specifically, in accordance with the VB example, a contract declaration creates two VB types, representing the client and server perspectives on the contract. For example, a declaration "Contract C" creates the type "C" (representing the client perspective) and the type "Implements C" (representing the server perspective). By way of example, following is an exemplary contract for an alarm clock service:

```
Contract AlarmClock
    In Message Set(t As TimeSpan)
    In Message Cancel( )
    Out Message Alarm( )
    Pattern
        Start:
            Set --> Alarm Set
        AlarmSet:
            Cancel --> End
            Alarm --> AlarmSet
    End Pattern
End Contract
```

Additionally, below is the contract for an alarm clock service that extends the contract to add a snooze capability:

```
Contract SnoozeAlarmClock
    In Message Snooze( )
    Pattern
        AlarmSet:
            Snooze --> AlarmSet
    End Pattern
End Contract
```

In order to provide context and for ease of understanding, a discussion of the grammar and semantics of a contract is provided below. By way of example,

```
ContractStatementGroup →
    ContractStatement [ ExtendsOrElaboratesStatement ]
    { HostsStatement } { ContractElementStatement } [
    PatternStatementGroup ] { ContractStatementGroup }
    EndContractStatement
ContractStatement →
    CONTRACT Identifier
EndContractStatement →
    END CONTRACT
ExtendsOrElaboratesStatement →
    ExtendsStatement |
    ElaboratesStatement
ContractElementStatement →
    MessageStatement |
    ContractStatementGroup |
    TypeDefinition
MessageStatement →
    MessageDirection MESSAGE Identifier [ ParameterList ]
MessageDirection →
    IN |
    OUT
PatternStatementGroup →
    PatternStatement {StateTransitionStatementGroup }
    EndPatternStatement
PatternStatement →
    PATTERN
EndPatternStatement →
    END PATTERN
StateTransitionStatementGroup →
    StateStatement { NameTransitionStatement }
    [ OthersTransitionStatement ]
StateStatement →
    Identifier [ OVERRIDES Name ] :
NameTransitionStatement →
    [ NameTransitionExpression ] --> StateTarget { AND StateTarget }
NameTransitionExpression →
    NameTransitionOperand [ NameTransitionOperator
    NameTransitionExpression ]
NameTransitionOperand →
    Name |
    ( NameTransitionExpression ) |
    [ ANY ] MessageDirection MESSAGE
NameTransitionOperator →
    THEN |
    AND |
    OR
StateTarget →
    [ IMMEDIATE ] Name |
    END |
    STOP
```

As earlier discussed with reference to FIG. 3, a contract can specify a set of messages 302, and, optionally, a pattern 304 describing allowable sequences of message exchange, and/or a contract extension 306 as illustrated in FIG. 3. It should be noted that if no pattern 304 is specified, all sequences of the specified messages are permitted. A contract extension mechanism 306 is a for adding to a contract such that a conversation between a connector typed using the elaborated contract and one typed using the elaborating contract is possible.

With reference again to FIG. 4 and proceeding to 404, a message can be declared. Next, at 406, a pattern can optionally be specified. The pattern specified in 406 can be specified as a state machine. The states can be named by the labels in the StateTransitionStatementGroups. In the alarm clock example above, the starting state is named "start". Message sends and receives as well as executions of other contracts provoke transitions in the state machine. It is contemplated that if a StateTransitionStatementGroup includes more than one StateTransitionStatement, then the pattern allows any one of the transitions in the group.

At 408 a trigger used in connection with the pattern can be defined. Specifically, a name to the left of the arrow in a MessageTransitionStatement is a trigger, and can name a message or a contract. Next, at 410 a target is identified. An identifier to the right of the arrow is a target, and can name a state. If there are no triggers, then the transition occurs if a trigger of a target state occurs. If a trigger is a contract, the effect is to execute a new instance of the contract's pattern. If there is more than one target, then the transition is to all of the targets in parallel. This situation is referred to as a split transition. If a target is Immediate, the transition occurs when the first trigger begins, rather then when the last trigger completes. It should be noted that this is especially useful when a trigger is a contract.

In accordance with an example, the state

```
S0:
    M1 Then M2 --> S2
is equivalent to
S0:
    M1 --> S1
S1:
    M2 --> S2
Likewise, the state
S0:
    M1 Or M2 --> S2
is equivalent to
S0:
    M1 --> S2
    M2 --> S2
Additionally, the state
S0:
    M1 And M2 --> S3
is equivalent to
S0:
    M1 --> S1
    M2 --> S2
S1:
    M2 --> S3
S2:
    M1 --> S3
```

Those skilled in the art will appreciate that "Or", "And", and "Then" have the same precedence relation as "Or", "And", and "AndAlso" respectively in the expression syntax.

In one aspect, a trigger given as "In Message" or "Out Message" can represent any message declared in the contract traveling in the appropriate direction. In another aspect, a trigger given as "Any In Message" or "Any Out Message" represents any message traveling in the appropriate direction, and can be a message not declared in the contract.

A given state can make at most one transition for a given trigger. In accordance with the present system and method, if a state makes a transition for a message, the state accepts the message. A state can accept more than one message, and the messages accepted by a state do not necessarily all travel in the same direction. For example, if all messages do not travel in the same direction, the target state for any message accepted by state S that does not accept all messages accepted by S that travel in the opposite direction ignores those messages.

A transition to End terminates the current line of the state machine. A transition to Stop terminates all lines of the state machine. It should be noted that, in the absence of split transitions, End and Stop are equivalent.

Referring again to FIG. 4, in accordance with the present system and method, messages can be sent and received through connections. A connection is a datum with a type that is a contract type declared at 402. It will be appreciated that the contract type can be specified by naming the contract. On the other hand, a connection can be a datum with a type that is a contract implements type. Contract implements types can be specified by preceding the name of the contract with the designation "Implements". A connection with a contract type can send In messages and receive Out messages. A connection with a contract Implements type can send Out message and receive In messages.

Split Transitions

If at 410 a state transition has more than one target, then the transition is referred to as a split transition to all of the targets in parallel. For example, a split transition merges partially at a state S if some paths from the split transition converge at S, and merges completely if all paths do. If a state T is a direct or indirect target of a split transition, there cannot be a path to T that does not go through the split transition unless the split transition has completely merged at or before T. If a split transition merges at state S, no transition from S is possible until all paths from the split transition have arrived at S. Informally, splits/merges properly nest, and no transition into the middle of a split/merge is possible.

By way of example:

The pattern

```
Pattern
  Start:
    M1 --> Start And S1
    M2 --> S2
  S1:
    M3 --> S3
  S2:
    M4 --> S3
  S3:
    M5 --> End
End Pattern
``` accepts the sequence of messages M1, M1, M2, M4, M3, M3, M5. Each split transition that includes S1 requires an M3 to transition to the merge state S3, so there can be an equal number of M3 and M1 messages.

The pattern

```
Pattern
  Start:
    Con1 --> Immediate S1 And S2
  S1:
    M1 --> End
  S2:
    M2 --> End
End Pattern
``` allows M1 to be intermixed with the messages of Con1, but requires that M2 occur after Con1 completes. It should be noted that this pattern also illustrates that End can be a merge state.

Contract Extension

In accordance with the present system and method, at 412 a contract extension mechanism (e.g., 306 of FIG. 3) can be employed to add to a contract such that a conversation between a connector typed using the elaborated contract and one typed using the elaborating contract is possible. Only one end of the conversation has a choice about which contract to use. The determination is made by the type of extension.

An example of the grammar and semantics is as follows:

ExtendsStatement→
   EXTENDS Name

Here, the name in an Extends statement can name a contract that is not the containing contract or a contract that extends or elaborates the containing contract.

If contract B extends contract A, then:
   All messages of A are messages of B.
   All states of A are states of B.
   All contracts hosted by A are hosted by B.
   B cannot remove any transitions from the states it has inherited from A.
   B can add messages, states, and hosted contracts.
   B can add transitions to the states it has inherited from A.
      All of the added transitions can be for messages traveling in the same direction. For example, if the added transitions are for In messages, a client can connect to a service implementing B using either A or B. If the added transitions are for Out messages, a client can connect to a service implementing A using either A or B.
   In program text, a state of A is repeated in B only if B adds transitions to it, and only the added transitions appear. It is to be noted that, in a design, the inherited transitions are visible, but visually marked as immutable.

Connectors

With reference again to FIG. 2, in accordance with the present system and method, an exchange of messages between acts 204 and 206 takes place via a connection. The code at each end of the connection sends and receives messages through a connector which is created via a connector factory. For a contract type CT, a client-side connector has type CT, while a server-side connector has type Implements CT.

Orchestration

Further, a Split operation generates multiple lines of execution, any one of which executes until it yields, at which point any of the others can run. Various language operations can cause a line of execution to yield. Among these are Receive (e.g., wait for a message to arrive) and Wait (e.g., wait for a specific interval of time).

A set of methods form an orchestration unit, or can be said to orchestrate together, if a yield in one of them can allow a line in another to execute. Note that this does not allow execution to proceed past a method call until the call returns. The instance methods of an orchestration class (including those in base and derived classes) orchestrate together for a given instance.

An orchestration class is declared with an "orchestration" modifier. An orchestration class cannot have shared methods or properties. In accordance with the aspect, orchestration operations are VB statements and, subject to some restrictions, can appear in any method.

With reference again to FIG. 2, at 204, a Send statement can be configured as follows:

```
SendStatement →
    SEND [ TO Expression ] SendMessageDescriptor
SendMessageDescriptor →
    SendSpecificMessage |
    SendMessage
SendSpecificMessage →
    Identifier [ ( Arguments ) ]
SendMessage →
    MESSAGE Expression
```

In accordance with the aspect, a Send statement sends a message through a particular connector, which is an optional expression. An absent connector expression can imply that the message will be sent through the primary connector, and is permitted only within a service. It will be appreciated that the connector expression can be of a contract or contract implements type.

If present, the identifier can name a message of the contract, and the message can have the appropriate direction. Similar to a method call, the arguments are type checked against the parameters of the message.

If the Message keyword is present, the expression can be convertible to System.MessageBus.Message, and identifies the message object to send.

Similarly, at 206, a Receive statement can be configured as follows:

```
ReceiveStatement →
    ReceiveClause
ReceiveClause →
    RECEIVE [ FROM Expression ] ReceiveMessageDescriptor
    [ WHEN Expression ]
ReceiveMessageDescriptor →
    ReceiveSpecificMessage [ ReceiveMessage ] |
    ReceiveMessage
ReceiveSpecificMessage →
    Identifier [ ( { ReceiveParameterList } ) ]
ReceiveMessage →
    MESSAGE ReceiveParameter
ReceiveParameterList →
    ReceiveParameter {, ReceiveParameterList }
ReceiveParameter →
    Identifier [ AS GeneralType ]
```

A Receive statement can receive a message through a particular connector, blocking until the message arrives. An absent connector expression implies that the message will be received through the primary connector and is permitted only within a service. The connector expression can be of a contract or contract implements type, the identifier, if present, can name a message of the contract, and the message can identify the appropriate direction. Parameters declared in a Receive statement are scoped similar to local variable declarations. Additionally, parameters that are not declared in the receive statement can be declared as local variables elsewhere.

If the Message keyword is present, the associated parameter can be declared as System.MessageBus.Message, and the Receive can assign the received message object to the local variable. If the Message keyword is present and no specific message name is given, the Receive can receive any message that satisfies the filter expression, if present.

As well, if present, the When expression in a Receive acts as a Boolean filter. If a filter expression is present, the message is received if the filter evaluates to True and otherwise it is ignored until some other Receive consumes it. The filter expression can access the parameters of the receive clause that it is attached to and members of the received message object, but no other non-constant declarations. An absent filter expression is equivalent to a filter expression that always has the value "True."

For example, a Receive statement of the form

```
Receive From C Mumble(P As T)
    NextStatement( )
is equivalent to
    Dim P As T
    Select Receive
        Case Receive From C Mumble (P)
    End Select
    NextStatement( )
        A Wait statement can be configured as follows:
WaitStatement →
    WAIT Expression
```

A Wait statement blocks execution for the specified interval of given by the expression, which can be of type System.TimeSpan. A Wait statement allows a line of execution to yield, even if the interval is zero.

```
A wait statement of the form
    Wait Span
    NextStatement( )
is equivalent to
    Select Receive Within Span
        Case TimeOut
    End Select
    NextStatement( )
        Note: it is important that Threading.Thread.Sleep( ) not be used
inside orchestration code as it can block the thread without allowing
another line in the orchestration to run.
        Once received, transition can be provoked at. A Begin statement
can be configured as follows:
BeginStatement →
    BeginClause
BeginClause →
    BEGIN Identifier TypeAndInitializer
```

The identifier can be declared as a local variable. The type of the variable can be a contract type or a contract implements type. An initializer can be present.

A Begin statement waits for the beginning of a conversation that is governed by the specified contract. Those skilled in the art will understand that a Begin statement represents a sort of in-line service. Such a conversation begins when another body of code creates a connector of the inverse of the contract type and then sends a message through that connector. When the conversation has begun, the initializer is evaluated, its value assigned to the variable, and execution proceeds.

Begin provides a mechanism for correlating subconversations. For a correlated subconversation, the initialization of the connector is a New expression with a connector as its sole argument. The connector at the other end of the connection will have been created by a New expression with a connector as its sole argument. As well, the two connectors supplied as arguments will have been connected.

```
A Begin statement of the form
    Begin C1 As New CT(C0)
    NextStatement( )
```

-continued

```
is equivalent to
    Dim C1 As CT
    Select Receive
        Case Begin C1 = New CT(C0)
    End Select
    NextStatement( )
        Finally, the message can be accepted at 208. Accordingly,
an Accept State Statement can be configured as follows:
AcceptStateStatement →
    AcceptStateClause
AcceptStateClause →
    ACCEPT [ FROM Expression ] Identifier
```

An Accept State statement waits until a connection transitions to a particular contract state. An absent connector expression can imply that the state will be accepted through the primary connector, and is permitted only within a service. The connector expression can be of a contract or contract implements type, and the identifier can name a state of the contract's state pattern.

An accept state statement does not consume any messages. In particular, the message that caused the state transition is not consumed. Unblocking requires a state transition. If the connection is already in the named state when an accept state statement begins, the accept state statement waits until the connection reenters the state.

It will be understood that the accept state statement can be particularly useful as part of the select receive statement, as well as part of the catch accept statement.

```
An accept state statement of the form
    Accept From C S
    NextStatement( )
is equivalent to
    Select Receive
        Case Accept From C S
    End Select
    NextStatement( )
        A Select Receive Statement can be configured as follows:
SelectReceiveStatementGroup →
    SelectReceiveStatement { CaseReceiveStatement {
    ExecutableStatement } } [
CaseTimeoutStatement { ExecutableStatement } ] EndSelectStatement
SelectReceiveStatement →
    SELECT RECEIVE [ WITHIN Expression]
CaseReceiveStatement →
    CASE CaseReceiveClause { , CaseReceiveClause }
CaseReceiveClause →
    ReceiveClause |
    BeginClause |
    AcceptStateClause
CaseTimeoutStatement →
    CASE TIMEOUT
```

It will be appreciated that a SelectReceive statement can receive one (or more) of a set of messages (each of which can be through different connectors), and/or starts one or more conversations, and/or accepts states of one or more connections, or times out, and executes the body of code associated with the message(s)/conversation(s)/state(s) or the timeout. The timeout expression must denote a time span.

If more than one CaseReceiveClause is present in a CaseReceiveStatement, all clauses can be satisfied to trigger execution of the body of code associated with the case.

A Split statement can be configured as follows:

```
SplitStatementGroup →
    SplitStatement { SplitLineStatement { ExecutableStatement } ]
    EndSplitStatement
SplitStatement →
    SPLIT
EndSplitStatement →
    END SPLIT
SplitLineStatement →
    LINE
```

A Split statement can suitably divide execution into logical lines of execution. The lines can execute sequentially in lexical order, except that whenever a line blocks waiting for a message the next unblocked line runs. It will be appreciated that no two lines of a Split statement ever execute concurrently. A Receive statement within a line of a Split cannot receive replies to messages sent from another line of the Split. Those skilled in the art will understand that this enables correlating replies to specific messages.)

```
A Split For Each Statement can be configured as follows:
SplitForEachStatementGroup →
    SPLIT ForEachClause { ExecutableStatement } NextStatement
        The body of a SplitForEachStatementGroup can be executed as if
each iteration were a separate line of a SplitStatementGroup. Complete
iteration through the collection can occur before executing the body.
        A Split Select Receive Statement can be configured as follows:
SplitSelectReceiveStatementGroup →
    SPLIT SelectReceiveStatement { CaseReceiveStatement {
    ExecutableStatement } } [
CaseTimeoutStatement { ExecutableStatement } ] EndSelectStatement
        A Split Select Receive statement automatically creates any
number of lines of execution to handle received messages,
initiated conversations, and timeouts.
A Split Select Receive statement of the form
    Split Select Receive
        Case Receive M From C
            Receive M1 From C
    End Select
is similar to, though subtly and significantly different from
    Do
        Select Receive
            Case Receive M From C
                Receive M1 From C
        End Select
    Loop
```

A Split Select Receive statement can be activated whenever a line yields, rather than waiting for a line to finish. A transfer of control by any line to a point outside the split select receive can terminate all other lines of the split select receive.

A Catch Receive Statement can be configured as follows. A try statement can have handlers that receive messages. A new form of catch statement can be used to implement this concept.

```
CatchReceiveStatement →
    CATCH ReceiveClause
```

A Catch Accept State Statement can be configured as follows. A try statement can have handlers that accept states of connections. A new form of catch statement be used to implement this concept.

```
CatchAcceptStateStatement →
    CATCH AcceptStateClause
```

New Exit Statement are contemplated. For example, new exit kinds can be Line and Split. These apply within Split, Split For Each, and Split Select Receive statements, and are not permitted elsewhere. An Exit Line statement can terminate a line of execution in a Split. An Exit Split statement can exit a Split and terminate all other lines of the Split.

Any other transfer of control that exits any form of Split can have Exit Split semantics, not Exit Line semantics.

Services

Again with reference to FIG. 2, next the contract is implemented at 210. In accordance with the present invention, a service (e.g., service 108 of FIG. 1) provides an implementation of a contract. A service is instantiated automatically upon receipt of an initiating message of the service's contract. The connector through which a service implements its contract is initialized automatically, is available implicitly for sending and receiving messages, and can be referred to explicitly as "Primary". In accordance with the described aspect, a service can have an instance method named "Run" that has no parameters and returns no result thus, activating the service calls Run.

A service is an orchestration class that derives directly or indirectly from RuntimeService. If no base class is specified, it is implicitly RuntimeService.

Referring again to the alarm clock example earlier presented a service that implements the alarm clock contract given above can be configured as follows:

```
Service DecentAlarmClock
    Implements AlarmClock
    Sub Run( )
        Receive Set(T As TimeSpan)
        Select Receive Within T
            Case Receive Cancel( )
            Case TimeOut
                Send Alarm( )
                Receive Cancel( )
        End Select
    End Sub
End Service
```

Additionally, below is an exemplary service configured to implement the snooze alarm clock contract of the earlier example:

```
Service NicerAlarmClock
    Implements SnoozeAlarmClock
    Sub Run( )
        Receive Set(T As TimeSpan)
        Do
            Try
                Wait T
                Send Alarm( )
                Receive Snooze( )
                T = SnoozeInterval
            Catch Receive Cancel( )
                Return
            End Try
        Loop
    End Sub
End Service
```

Turning now to the grammar and semantics of a service:

```
ServiceStatementGroup →
    ServiceStatement { ServiceMemberStatement } EndServiceStatement
ServiceStatement →
    SERVICE Identifier
EndServiceStatement →
    END SERVICE
ServiceMemberStatement →
    ServiceStatement |
    MessageStatement |
    ClassMemberStatement
```

In accordance with the above, a service cannot have both an implements statement and any message statements. However, if an implements statement is present, there will be one, it can name a single type, and that type can be a contract.

A service can have an implied primary connector, which implements a contract. The implemented contract can be named in an implements statement. If a service is declared without an implements statement, then the service can declare the messages that can pass through its primary connector, and a pattern will be derived from the service's methods. In other words, any service implements a contract.

The primary connector can be available within the service as Primary. If the connector expression is omitted from a Send or Receive statement, the connector can implicitly be Primary.

A call to a service returns a new instance of a connector typed as the service's implemented contract.

Turning now to a more general discussion of the present invention, when one speaks of clients and servers in an n-tier or in any general distributed context, it is important to define the terms very strictly to avoid confusion. For example, in a VB environment, "service clients" are those orchestration objects that are not started by a message being sent. In other words, a service client can be started in some other way. On the other hand, a "service" is any object that is created by a message being sent to it. It will be appreciated that there is no other way to start a "service." As a somewhat looser concept, a "client" is any piece of code, whether service or service client, which initiates communication with a service.

Contracts

Referring again to contracts generally, contracts can be used in OO languages (e.g., VB) to specify a protocol and its messages. This discussion will focus on three parts: contract import statements, message declaration statements and a single pattern definition statement as shown below:

```
Contract CtRequestResponse
    In Message Request(Question As String)
    Out Message Response(Answer As String)
    Pattern
        Start:
            Request Then Response → End
    End Pattern
End Contract
```

Above is a definition of an inbound message called "Request" that will pass a String along. Likewise, an outbound message called "Response" is defined that will also pass a String along. Note that the message itself is a name and not a "clump" of data. Rather the message itself is an identifier for it, similar to a class name in that regard. The data can be defined as parameters of the message.

In addition, also defined is that the protocol allows only two messages in any "session:" a Request and a Response. The directions of the two messages in the interaction are implied by the respective message declaration. It will be appreciated that one person's inbound message is another person's outbound message. In accordance with the present invention, this perspective is from the perspective of the service that implements the contract.

Each interaction over a protocol consists of two parties interacting, sending messages back and forth thereby affecting each other's internal state or having some external effects that are useful. In each such coupling of two parties, for clarity, the parties are labeled the implementing party and the using party.

In VB orchestration of the disclosed aspect, this is referred to as contract perspective. It is to be appreciated that that the compiler will not allow an inbound message to be sent by the implementing party or received by the using party, nor will it allow an outbound message to be received by the implementing party or sent by the using party.

One might observe that the above contract is essentially the complexity that any synchronous message-passing mechanism allows: one message goes one direction, and another comes back as a response. If there is no return data, or any parameters on the procedure call, then the corresponding messages are adjusted accordingly, but there is always one single inbound message followed by one single outbound message in the synchronous pattern. As will be discussed below, protocols can be defined in a large variety of ways, and VB orchestration can facilitate full programmatic access to this powerful technology.

Essentially, employing contracts permits declaring messages and patterns. However, contracts can add a tremendous level of security and robustness to any protocol implementation, as they can allow the compiler to check that the protocol is being adhered to by the code. At a minimum, contracts are enforced at runtime, and often at compile time.

In accordance with the present invention contracts are one of the fundamental language additions in VB orchestration of the disclosed aspect. Below is a continued discussion of details related to contract declaration.

Message Declarations

With reference again to FIG. 4, the example above illustrates a methodology to declare contracts. Specifically, at 404, an act of declaring a message is illustrated. Those skilled in the art will appreciate that they essentially share similar general rules as Sub declarations, with the following constraints:

1. All parameters that are "ByVal," "Optional," "ByRef," or "ParamArray" declarations are not allowed;
2. For any protocol that will be used remotely, all parameters are serializable;
3. All messages have to have a direction specified; and
4. Messages cannot be overloaded.

Pattern Declarations

Turning now to pattern declarations at 406, the most basic building block of any pattern declaration is a message reference. In the above example, one will appreciate that it is only necessary to mention the name of the message when referring to it in a pattern. This is because its direction is well known. Additionally, overloading is not permitted, and additional restrictions cannot be placed on messages beyond the direction and parameter types once it has been declared. It should be noted that there is, for example, no way to specify that the string arguments in the above example have to be non-null, if that is a restriction that is desired.

Patterns are declared by defining a set of named "states" of the protocol, e.g., different positions in the conversation that have some meaning to it. The first state of any pattern can be called "Begin."

Once the states are defined, the protocol can be completed by adding state "transition" to indicate how the protocol state may change. It will be appreciated that triggers and targets can be identified in connection with acts 408 and 410. In one aspect, such transitions are triggered by messages. In other aspects, the messages can be represented by methods or an imported contract.

By way of example,

```
Contract CtRequestResponse
    In Message Request(Question As String)
    Out Message Response(Answer As String)
    Pattern
        Start:
            Request Then Response → End
        End Pattern
End Contract
```

As set forth above, the phrase "Request Then Response" is a transition trigger, and "End" the transition's end state. Transition triggers can in other words be composite. For example, composite transition triggers can be employed either by sequencing a set of messages using "Then" or by grouping them unordered using "And." As well, it is also possible to specify an alternative set of triggers using "Or" between message names. The transition occurs as soon as all the messages of the trigger have been sent or received.

Transition end states can be more than one state. For example, a transition can "split" into two or more target states, which means that the protocol "position" is defined by more than one named state at once. In one aspect, a target end state can also have the modifier "Immediate" attached, which means that the transition to that state occurs immediately upon matching a particular trigger rather than waiting for the full trigger to complete. This is particularly useful when the trigger contains contract names.

As previously discussed, it will be appreciated that a contract that does not have any pattern allows any message exchange pattern; a contract that has an empty pattern allows no messages to be exchanged.

Contact Extension

Figure 5:
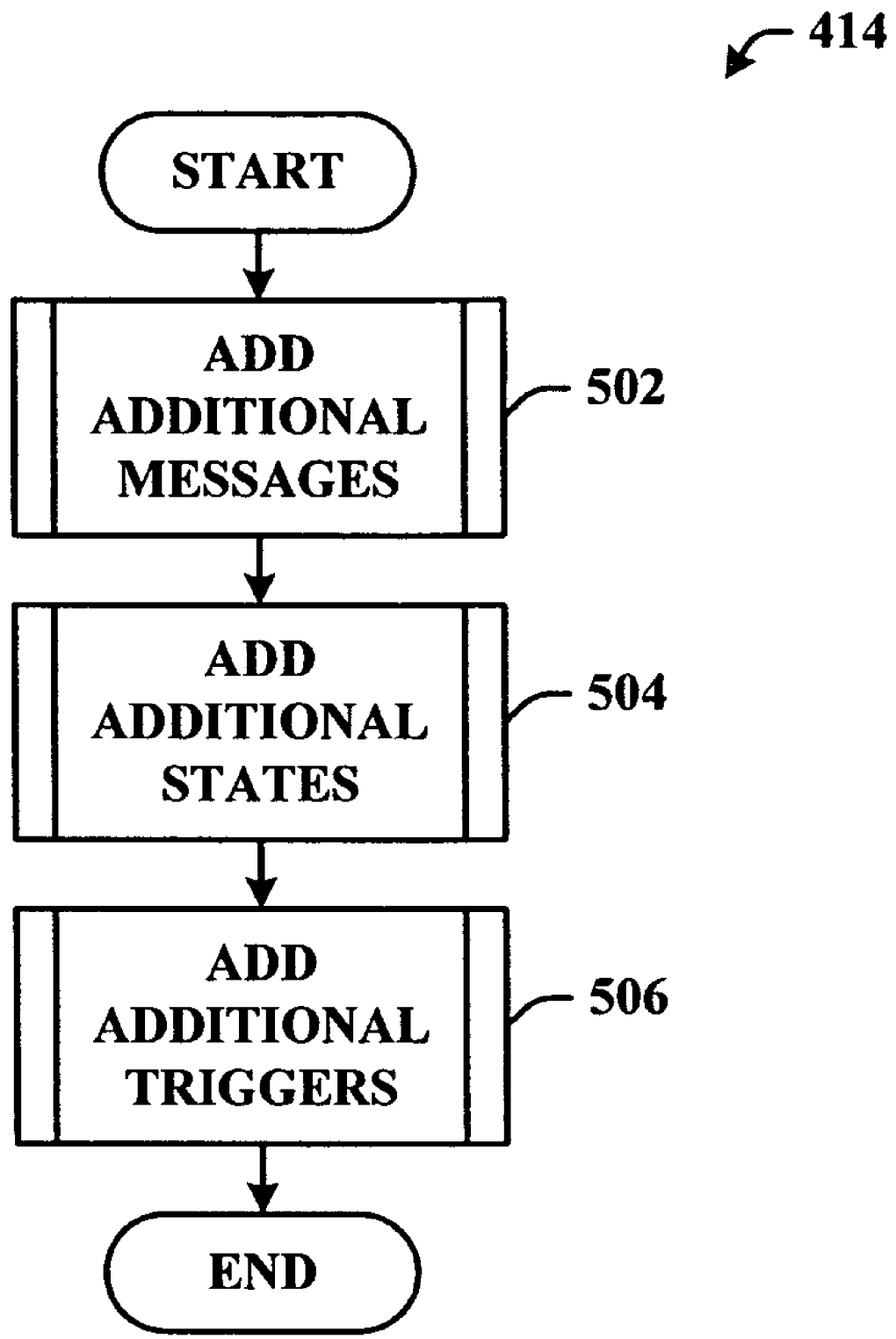
FIG. 5 illustrates a flow chart of procedures to facilitate contract extensions in accordance with an aspect of the disclosed invention.

Additionally, aspects of the present invention employ contract extensions as illustrated in FIG. 4 at 412. FIG. 5 illustrates a methodology that facilitates extending a contract. By extending a contract in accordance with the methodology, a new version can be created that is asymmetrically compatible with the old one. Specifically, when extending a contract, at 502, new messages can be added. As well, at 504 new states can be added to the existing pattern. In addition, new triggers can be added to existing states at 506, subject to some constraints as follows:

1. No ambiguities can be introduced.
2. No existing triggers can be altered.
3. Triggers added to existing states cannot have both "In" and "Out" messages as the first possible messages: the message direction is to be the same.
4. If a trigger is added to an existing state, and if the trigger is an "In" message, then all triggers added to any existing state contain only "In" messages.
5. Conversely, if a trigger is added to an existing state, and if the trigger is an "Out" message, then all triggers added to any existing state can contain only "Out" messages.

In accordance with these constraints, the model for contract reuse can be similar to inheritance for classes. In one aspect, (e.g., only "In" messages are added to existing states), the new contract is client-compatible, and in the other case, it is service-compatible.

A client-compatible contract means that the service can be upgraded from the old contract to the new without clients having to know. In other words, a client using the old contract will never send messages that trigger transitions to new states. On the other hand, a client that is aware of the newer contract can utilize it only if the service supports it. Thus, it will be appreciated that this relationship is an asymmetrical compatibility.

On the other hand, if the contract is service-compatible, then clients can be upgraded to use the new contract and continue to have conversations with services that support either the old or new contract.

Below are examples utilizing a modified version of the earlier presented request/response example:

```
Contract CtRequestResponse
  In Message Request(Question As String)
  Out Message Response(Answer As String)
  Pattern
    Start:
      Request → S1
    S1:
      Response → End
  End Pattern
End Contract
```

Client-Compatible Example:

```
Contract CtRequestResponse1
  Extends CtRequestResponse
  In Message RequestInt(Question As String)
  Out Message ResponseInt(Answer As Integer)
  Pattern
    Start:
      RequestInt → S2
    S2:
      ResponseInt → End
  End Pattern
End Contract
```

As set forth in the exemplary code above, if a client only is aware of the old contract, then it can still connect to a service that supports the new contract, since as long as the new messages are never sent, the contracts are interchangeable. As shown above, the service will not be able to discern the difference between a client that uses the old contract and one that simply does not avail itself of the new features.

Service-Compatible Example:

```
Contract CtRequestResponse2
  Extends CtRequestResponse
  Out Message ResponseInt(Answer As Integer)
  Pattern
    S1:
      ResponseInt → End
  End Pattern
End Contract
```

Here, the service can determine whether to go beyond the existing contract or not. Accordingly, the upgraded client will not be able to tell whether the service uses the old contract or the new one. Note that in the extended pattern only new information is listed: new states and new triggers for existing states. This avoids a source of errors, and if clarity is necessary, the old contract pattern can be included as comments.

It will be understood that a contract A may extend contract B by adding hosted contracts and no messages. In this case, A is symmetrically compatible with B. Hosting contracts will be discussed in more detail later in this text.

Connectors

Contracts can be employed to declare something that refers to them. In accordance with the exemplary aspects, the object that VB orchestration-based code uses to communicate with other code is called a "Connector."

As far as type is concerned, Connectors are contract reference types. There are peculiarities about Connectors. For example a Connector has a well-defined contract perspective which is a part of its type. It either represents the implementing side of the contract, or the using side. An implementing connector cannot be assigned to a using connector, or vice versa. In accordance with these rules, it is reasonable to wonder how one creates connectors, and how one defines whether it is implementing or using.

Connectors can be created using connector factories which can be defined by the runtime (e.g., VB runtime). Most connector factories are created from service URLs or other connectors:

Dim cFact As ConnectorFactory (Of CtRequestResponse)= ServiceURL

The URI here is called the service reference. It can be some well-known URI kept in a configuration file, or it could be put together at runtime by some other brokering service. For example, there might be a wholesale distributor bidding service that determines the location of the best deal is and sends the URI to that distributor back to the requester.

Once one has a connector factory, Connectors can be created with ease using a conversion operator that is built into the connector factory class:

Dim Connector_1 As CtRequestResponse=cFact

This exemplary statement creates a using-perspective connector referring to the service addressed by the connector factory and which can implement "CtRequestResponse" on its primary connector. This usage of connector factories can generate using-side connectors.

It will be understood that a connector factory can also be bound directly to a connector of implementing perspective as follows:

Dim cFact As ConnectorFactory (Of CtRequestResponse)= Connector 4

This aspect can be useful in circumstances where it is well-known that both sides are in the same application domain and will not need to be broken apart. As it requires adding code into the application that will prevent it from being distributed, it is generally discouraged, but useful for performance in special cases. The previous examples are using-perspective connectors.

On the other hand, implementing connectors can be declared different in two ways. Specifically, the contract name can be modified by the keyword "Implements" and the initializer expression has to be a contract invocation with no arguments as follows:

Dim Connector_4 As Implements Ordering=Ordering( )

When a using-perspective connector is initialized, it is bound to the corresponding implementing connector, but an implementing connector does not initiate binding, so it does not need a service reference as a parameter. The resulting connector is thus unbound after being created, and cannot be used for sending messages until some using-side connector has bound itself to the new connector.

Note that a service, as defined earlier, has an implicit implementing connector called its "primary" connector. It is created by the runtime algorithm before the service is started, and available to the schedule as the "Primary" field. In sending and receiving messages, the primary connector can be implied when no other connector is referenced, so one rarely sees any code that actually refers explicitly to the primary connector. As described in detail below, the primary connector can be employed to create a service reference for multiplexing.

Connectors can be declared wherever variables of reference type can be declared. For example, connectors can be declared as locals, as parameters, and/or as fields, in VB Modules, or the like. They can be passed by reference, and copied to other variables, similar to any object reference. In accordance with an aspect of the present invention, the connector's perspective cannot ever be altered. As well, the compiler can ensure this through its strong typing. In the aspect, it is therefore not permissible to use "Option Strict Off" in any source file that defines or uses connectors, or services in general.

Sessions

One novel aspect regarding orchestration of the present invention is that it can reduce concern regarding threads, processes, or other aspects that are typical issues with scalable multi-threaded applications. With proper care and foresight, threading and process isolation can become an application distribution and management problem instead of an application development problem.

However, one concept that is not typically a problem with relation to non-distributed applications, but that is essential to VB orchestration, is the concept of a session.

The following example is provided for ease of understanding. A user that has employed the Internet to shop or access into a financial institution site to access account information or pay bills should be familiar with sessions in the distributed application sense. Particularly, when the e-commerce site is accessed and items are added to a shopping cart, or the "My Account" page is accessed, the web site software has to allocate some objects in memory so that it can remember the visitor and what has been done since the time of logging in. This data can be temporary and different from the order information or account information that persists over a long time which is typically stored in a database.

The lifetime of this temporary data is called a session. In a non-distributed application, data can be kept in memory until it becomes garbage. On the other hand, the situation is wholly different in distributed applications. In relation to distributed applications there are two primary problems. First, object references across application nodes do not exist. And secondly, one cannot count on being advised when a session is concluded.

The first point implies that if one counted on garbage collection to clean up objects, then all the temporary data would look like garbage very quickly and be removed. The application node would then forget everything about the visitor having been there before, which would be cumbersome. Therefore, such software can allocate session-specific data structures, typically in a global collection of some sort and retrieves it when a new request comes in for the same session.

Now turning to the second point, if one does not know when the session is over the session data will never become garbage, as global collections are famous for the memory leak issues that they create.

To address these issues, sessions are typically timed. A timer can be set when the session is first created, and the reset on every incoming message or request. If it can be determined that the session is over, such as the web user logging out, the data is removed at that point. If that cannot be determined, then when the timer goes off, the session data is removed from the global hash table and the data becomes garbage.

It will be understood that the determination of a reasonable timeout interval is completely application-dependent. Web sites typically set the timeout interval at between 10 and 30 minutes, but that is not a universally valid setting. For some applications, a couple of seconds might be appropriate, and for others a few hours.

In accordance with exemplary VB orchestration, all of this is automatically supported. In one aspect, there is a default timeout value of 10 minutes. If 10 minutes is not appropriate, one can reconfigure the timeout in the App.config file. This reconfiguration is discussed in more detail below in with regard to "App.config Settings".

When a schedule is first started, whether it is a service or service client, its session can be created before anything else happens. The session effectively an instance of the service class. However, it is also assigned a globally unique identifier which allows clients to refer to it. Accordingly, the session is also called the service instance. It will be appreciated that the latter can be particularly useful when the need to indicate that one is referring to a specific object in memory, while the former can be particularly useful when one desires to look at it from the distributed application perspective.

A service instance typically has a number of connectors associated with it. Initially, connectors can be tied only to the schedule that created them, but in order to send messages to another schedule, connectors can be bound to other connectors, always of the same contract but opposing perspectives. Once bound, a connector cannot be rebound.

With reference to the examples above, the first three connectors created are all bound when the service or contract call returns. In the fourth case it is not. This is because the connector can only be used to create a service reference that some other connector uses to bind to. Once that has occurred, communication may start.

In the web service example above, it is important that the software handling the session does not store references to objects that are session-specific outside the session itself. Doing so means that when the session is removed, those objects do not become garbage and one of the main purposes of sessions, to control the lifetime of objects in distributed applications is violated.

It is equally important that this be done when programming VB orchestration, even if the entire application is at first within the same application domain. Allowing references created during a session to be stored outside the schedule will not allow the automatic management of global system resources that will ultimately determine whether the application can be made to scale or not.

The rule is simple—only store references to data state in references that are declared within the body of the service or schedule. In other words, do not store them in global variables or collections of any kind. This rule is easy to follow and very reasonable. As well, this rule is very similar in nature to basic reentrancy rules for other software. For example, avoid global state, instead, always pass data along as parameters.

Only if the data belongs as application-level data, that is, data to be shared among sessions in an application domain, should it be declared and stored outside the session. Even then, it should serve as a red flag that there might be something about the design of the application that needs rethinking.

Schedules (Orchestration)

Figure 6:
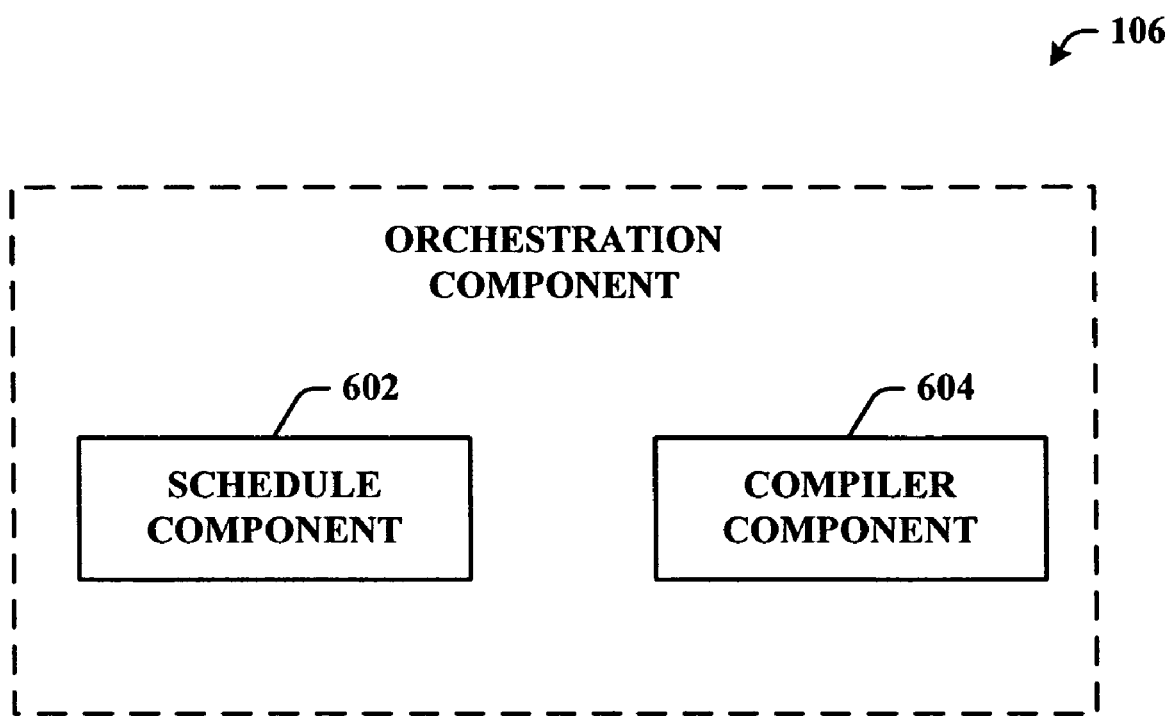
FIG. 6 illustrates a general component block diagram of an orchestration component in accordance with an aspect of the invention.

Now with reference to FIG. 6, a general block diagram of an orchestration component is shown. As shown, an orchestration component can be illustrated to include an implementation or schedule component 602 and a compiler component 604. In accordance with the present invention, a schedule component 602 is a runtime concept that has no source-code manifestation, but is nevertheless critical to an understanding of the following sections. Briefly put, a schedule component 602 is a runtime object that is used to allow message-oriented code to wait for more than one message in parallel.

Abstractly speaking, with respect to the exemplary VB environment, all methods have a schedule whereby the method returns when the schedule is complete. Concretely, only methods that contain message receives or wait statements as set forth below require a schedule. The VB compiler will make sure that the most efficient implementation is used as in a schedule-free implementation.

Given this runtime definition, a schedule can be broadly described as a body of message-related code, split between several methods or contained within one single method. The latter case is the default, e.g., each method with messaging code defines its own schedule.

On the other hand, the former is implemented using orchestration classes, which are all classes derived directly or indirectly from the class System.Orchestration.RuntimeOrchestration. Orchestration classes share one single schedule for all methods on an instance. The schedule can be started by an external (e.g., not using "Me") call to any instance method and extends across all internal method calls on that same instance until the original method returns.

Orchestration classes are similar to regular classes in all ways except that they have a required base class and cannot declare shared methods or properties.

Services

Further, in accordance with the present invention, services refer to orchestration classes that can be derived directly or indirectly (e.g., from other services) from the class System.Orchestration.RuntimeService. As well, services are auto-instantiated by the runtime.

In order to provide context, the following discussion clarifies two concepts related to a service; 1) the contract that the service's primary connector implements; and 2) its method of starting.

First, the contract can be defined in two ways: 1) by mentioning it by name in an implements statement; or 2) by derivation from the schedule body. An example of the former follows:

Service StockQuoteService
Implements CtRequestResponse
End Service

The contract here is the previously discussed request/response. For example, the service receives a stock ticker symbol as a string and replies with a string representation of the price at the last trade. Of course, using a different data type for the response could be a better idea, but the key point here is not how to design a good contract but how to use the contract in a service.

A service is always initiated by a client invoking the service by sending a message to the service that binds a using connector to an implementing connector that is created right before the service is started.

It is important to keep apart the service definition, which specifies a contract and a schedule, and which can be made available in a number of processes on a number of servers, and the service instances that represent specific sessions of the service.

It will be understood that a service is a type definition and a service instance is an object. However, because one never actually has (or can use) a reference to the service instance it is sometimes difficult to see this relationship. Services are only interacted with through connectors. Only if messaging is the single way to interact with a service can they be relocated or duplicated in the way that is necessary for a system to support scalable application designs. Thus, services cannot define constructors or be allocated using a "New" expression.

A second method to specify the contract that a service implements is to employ a compiler to derive it from the code included in the schedule. Here, the compiler dissects the code in order to interpret it. In other words, one does not have to write a contract definition. To use this mechanism, one only has to declare the messages that are used on the primary connector. To be able to create connectors using the contract of such services, the contract derived for the service can have a predictable name: e.g., "<service-name>.Contract."

Service StockQuoteService
In Message Request (Ticker As String)
Out Message Response (Quote As Money)
End Service However, deriving contracts, for all its convenience, creates a lack of abstraction.

As will be appreciated, contracts serve to explain exactly what goes on in the protocol. A derived contract, although always correct (as long as the service implementation is), has no guarantees of readability or ease-of-use. It directly reflects the internal structure of the service, which can be difficult to understand for a programmer that is trying to put together a client. There are also some situations that the compiler has trouble dealing with, and which will result in a very liberal contract.

Services, once started, can execute in parallel with the calling code, whether they are in the same application domain or not. Note that there is nothing stated about concurrency, merely parallelism. The two can be written and implemented as independent of each other's control flow, as long as they are synchronizing and sharing data only through messaging. Note that it is not necessary that different service instances be executed concurrently (e.g., in separate threads or processes) or that they will not.

Messaging

In view of the previous discussion, turning now to the concept of the schedule which can be defined as the body of code that implements a protocol on either its client or server side. There are two ways of looking at schedules; 1) to see them as procedures that send and poll for messages; or 2) to take a detailed look at their execution model, which is radically different from that of procedures.

As was stated previously in this specification, a naïve implementation of a protocol-handler would be as a method that sends messages through some message-sending API, and polls for messages using another API. Each service instance, in this conventional model, has to have its own thread of execution, a situation that is neither scalable nor allows for runtime tuning of the environment. Traditionally, each service instance needs a separate thread, and there is nothing more to it. The operating system (OS) determines which thread executes when, and there are no tuning controls available to application operators.

An initial problem with this conventional approach is that it requires too many allocated threads, taxing OS (e.g., kernel) resources as well as significantly increasing the memory footprint. As service instances come and go, OS threads have to be created and destroyed, which is expensive, and there is no "throttle" that allows to keep only so many threads active at one time (e.g., one per service instance is required).

To further complicate the issue, low-level position in the binary code is what contains the conversational state. Accordingly, it would be difficult to move the service instance to another machine or just simply inspect the conversational state.

Thus, in accordance with the present system and method, there are two fundamental aspects on any reasonable implementation of a protocol handler (e.g., service). First, there cannot be an assumption about the execution environment of the protocol handler. There might be a thread per handler, or threads can be shared between service instances, even those with overlapping lifetimes. Secondly, the conversational state can be represented in data rather than code.

Although one might assume that the second statement contradicts the discussion earlier about declaring the flow of the conversational state rather than implementing in data, it was intended that the developer should be able to see the conversation flow as declarative. The runtime model still needs to be one where the conversation state is represented in data. In other words, while the "naïve" model is appropriate as a source (e.g., programmer) view of the protocol handler, it will be appreciated that the runtime model can be very different. An artisan will appreciate that it is by bridging this gap that VB orchestration manages to accomplish the high level of productivity and readability boost.

Next, the schedule code is compiled into a separate class that contains all the logic of the source schedule, but re-arranged to support a different concurrency model. Upon starting the schedule, code executes until a pausing event (a.k.a. "yield point") occurs.

Once a pausing event occurs, the schedule ceases to execute and returns control to the site in the scheduling runtime that started it or to the site of the last resuming event. Currently, the only resuming events are message arrivals, message timeouts and wait-statement completion.

After pausing the schedule, its thread is given back to the runtime to use for whatever it so pleases, or destroyed, all depending on the thread model of the underlying runtime. It will be appreciated that a more sophisticated hosting framework might rely on a thread pool for all its activities, while a more basic one might create a new thread every time it needs one. The code of the schedule can make no assumptions one way or another. Note that the first pausing event in a non-service context (e.g., a call to a method) can cause the thread that is used to block until the schedule is done.

When a message arrives and is routed to a particular service instance and it is discovered that there is a pausing receive waiting for it, a method that holds the body after the receive statement can be invoked by the runtime. This invocation point now becomes the new resumption site (a.k.a. "continuation point"), and the call will not return until the schedule pauses again.

In other words, schedules are implemented as callbacks with conversational state exposed as data, but the code still appears as polling code, where the conversation's flow is declared using the familiar language constructs of the exemplary VB.Net.

In accordance with the present invention, appropriate language additions can be made for message handling and parallelism within schedules, but mostly, the schedule code will consist of normal VB statements: everything from loops and if-statements to exception blocks and variable declarations.

Sending and Receiving Messages

The most basic operations in any protocol code, whether on the client or server side, are to send a message at one end of a connection and receiving it at the other end.

In operation from the beginning, before a message can be received, it has to be sent, and the syntax for doing so is very straight-forward:

Dim qteSrvceConnector As CtRequestResponse= . . .
Send To qteSrvceConnector Request ("MSFT")

The request/response contract has been described earlier. The send statement can have a connector of some sort. The connector is implicit if the schedule is a service and the send operates on the primary connector. In this example, a client is connecting to a service for the first time.

Note that unlike the case in the service client invocation earlier, the send statement does not return a value. It will be appreciated that the whole point of asynchronous message passing is to make all data passing explicit, so any bi-directional communication requires a send and a receive on each end.

On the service side, that is, the implementing side, the message would be processed this way:

Receive Request (Ticker As String)

Note that there is no connector reference in this statement. The service will receive the message on its primary connector. To reply, the service would send the result back as a string value, according to the contract definition:

Send Response ("75.57")

Aside from the fact that the stock quote service is entirely unreliable and rather static in its data acquisition strategy, this is all there is to it. Now, the message has to be received on the other end. As illustrated, the variable where the message parameter will go outside the receive statement is declared.

Dim Value As String
Receive From qteSrvceConnector Response (Value)

The above example is a representation of a complete schedule-based application.

```
Contract CtRequestResponse
  In Message Request(Question As String)
  Out Message Response(Answer As String)
  Pattern
    Request Then Response → End
  End Pattern
End Contract
Service StockQuoteService
  Implements CtRequestResponse
  Sub Run( )
    Receive Request (Ticker As String)
    Send Response("75.57")
  End Sub
End Service
Public Class StockQuotesRUs
  Public Function StockQuoteClient (tcr As String, addr As Uri) As String
    Dim Value As String
    Dim qteSrvceConnector As CtRequestResponse = _
      CType(addr, CtRequestResponse)
    Send To qteSrvceConnector Request(Ticker)
    Receive From qteSrvceConnector Response (Value)
```

-continued

```
        Return Value
    End Function
End Class
```

It will be appreciated that by adding a statement such as "Option Strict On" (e.g., VB orchestration currently requires strict-mode compilation) at the top of the file, or by adding some app code to call the service client, the code can be executed with no further configuration. This code can be found in under the "sample-1" directory.

In accordance with the execution model of these statements, when a receive statement is executed, and there is no message matching it already available, the schedule will pause, e.g., give up the thread that it is using. If a message is available, it will not pause, but execution will immediately continue on the next line. Send statements never pause—as soon as the message is accepted by the underlying system, the statement terminates.

When a message arrives at a schedule, if the runtime finds the schedule paused waiting for a message of that kind, then the schedule is immediately resumed, typically on the same thread that the runtime is using.

One may incorrectly believe that this is not sufficient for all the powerful protocols that can be expressed in the contract language. For example, situations where the system waits for a variety of messages that come in at once, e.g., two transitions out of the same state, or triggers with multiple unordered messages or a split contract definition.

To address these alternative transitions situations, VB orchestration defines a variant of the "select" statement to handle receiving one out of a set of messages:

```
Select Receive
    Case Receive Request(str As String)
    . . .
    Case Receive Itsover1( )
    . . .
End Select
```

In accordance with this exemplary code, only one of the two messages "Request" and "ItsOver1" will be received in this statement. However, if it is desired to receive A and B (in any order) or just C, as shown below:

```
            State_1:
              A And B → State_2
              C → State_3
```

The following code can accomplish this goal:

```
Select Receive
    Case Receive A( ), Receive B( )
    . . .
    Case Receive C( )
    . . .
End Select
```

Specifically, by placing receive statements on the same line, e.g., in the same "Case" statement within the "select Receive," one can specify that it will receive all of the messages in some undefined order before proceeding. The case to first fulfill all its incoming messaging needs is the one that is ultimately chosen. As far as the select-statement is concerned, if C comes in after A but before B, then A is made available to be received at some other point in the future.

Turning now to implementing the CtRepeatedRequestResponse contract:

```
Contract CtRepeatedRequestResponse
    In Message Request(Question As String)
    Out Message Response(Answer As String)
    In Message ItsOver1( )
    Out Message ItsOver2( )
    Pattern
      Start:
        CtRequestResponse → Start
          ItsOver1 Or ItsOver2 → End
    End Pattern
End Contract
Service StockQuoteService
    Implements CtRepeatedRequestResponse
    Sub Run( )
      Do
        Select Receive
          Case Receive Request (Ticker As String)
            Send Response("75.57")
          Case Receive ItsOver1( )
            Exit Do
        End Select
      Loop
    End Sub
End Service
Public Class StockQuotesRUs
    Public Sub GetStockQuotes(addr As Uri)
      Dim qteSrvceConnector As CtRepeatedRequestResponse = _
        CType(addr, CtRepeatedRequestResponse)
      Dim cmd As String = " "
      Console.WriteLine("Enter ticker symbol: ")
      cmd = Console.ReadLine( )
      While cmd.ToLower <> "quit"
        Send To qteSrvceConnector Request(cmd)
        Receive From qteSrvceConnector Response (Value As String)
        Console.WriteLine("Quote for "" & cmd & "": " & Value)
        Console.WriteLine("Enter ticker symbol: ")
        cmd = Console.ReadLine( )
      End While
      Send To qteSrvceConnector ItsOver1( )
    End Sub
End Class
```

There are several aspects that are noteworthy here. First, the "select Receive" statement in action is illustrated, but it is also nested within a regular "Do" loop statement. There are very few restrictions regarding the inclusions of a schedule (e.g., "Language Restrictions" are discussed below), loops are not among them. In the service client a loop is used around the send/receives, which is where the system interacts with the user that is permitted to ask again and again for a stock quote. This code is available among the DVS samples as as Sample-2.

In accordance with this example, the service client is taking a chance. For example, assuming the service were to send an "ItsOver2( )" message when it felt that it would be appropriate, for example after not hearing from the client for a whole minute. Here, the service client could also use a "select Receive" statement to deal with this possibility.

The service would be able to detect that there has not been a message for a whole minute. For instance, the service might decide that this is a bad sign that the client may have went away without sending an ItsOver1 message. There needs to be some way of dealing with this situation. Session timeouts are useful, as discussed above, but often too drastic.

Rather, a timeout interval can be placed on the "select Receive" statement and to obtain finer control over the situation when the message does not arrive:

```
Service StockQuoteService
    Implements CtRepeatedRequestResponse
    Sub Run( )
        Do
            Select Receive Within TimeSpan.FromMinutes(1)
                Case Receive Request (Ticker As String)
                    Send Response("75.57")
                Case Receive ItsOver1( )
                    Exit Do
                Case TimeOut:
                    Send ItsOver2( )
                    Exit Do
            End Select
        Loop
    End Sub
End Service
```

The type of the interval can be System.TimeSpan. The "FromMinutes" method call above is one of the shared methods on that type, which allow a TimeSpan to be constructed from a particular time unit (e.g., seconds, minutes, hours). Refer to the .NET framework documentation for more details on System.TimeSpan.

The definition of the "select Receive" statement is that if the TimeSpan is 0, then the timeout branch will be taken if a branch cannot be immediately satisfied from the messages that have already arrived and are waiting. In other words, it is a way to make sure that the select-receive statement does not pause. It allows a schedule to do a quick check for some messages that if they are available should be handled immediately; if not, then there are better things for the schedule to do.

Note that the above examples did not just let the session timeout and have the service instance go away: rather, they had the opportunity to send the "ItsOver2" message to the client, notifying the client, which may very well be doing fine waiting for a slow user. This is part of being a good "service citizen" (e.g., notifying its partners that it will be going away).

Split Lines

While "select Receive" was sufficient for supporting alternatives and unordered message groups that trigger a single state transition, it is inconvenient when supporting splits in the contract. In this example, assume that the contract pattern is this:

```
State_1:
    A → State_2, State_3
State_2:
    B → State_4
State_3:
    C → State_4
```

On the receiving side, this could be coded this way:

```
Dim gotA As Boolean = False
Dim gotB As Boolean = False
Dim gotC As Boolean = False
While Not gotA AndAlso Not gotB AndAlso Not gotC
Select Receive
    Case Receive A( ) When Not gotA
        " Handle A
        gotA = True
    Case Receive B( ) When Not gotB
        " Handle B
```

```
        gotB = True
    Case Receive C( ) When Not gotC
        " Handle C
        gotC = True
End Select
End While
```

Notice how all this bookkeeping has to be completed to keep track of which messages have already been received (and should therefore not see again). The exemplary VB orchestration deals with this type of situation. For example,

```
Split
    Line
        Receive A( )
        " Handle A
    Line
        Receive B( )
        " Handle B
    Line
        Receive C( )
        " Handle C
End Split
```

There is no bookkeeping code whatsoever here. In other words, each message receipt can be handled independently of the others.

The "split" statement can provide VB orchestration with parallelism without having to be concerned with the complexities of concurrency. What the statement above means is that the three nested blocks within the "split," called the split lines, can execute independently of each other, e.g., in parallel.

However, they are not executed concurrently, and the management of this is taken care of through the pause and resumption process described earlier. A split line cannot be resumed until all other lines in the schedule are paused.

When the "split" is executed, all of its split lines are initially paused, and then the split lines are resumed in order of declaration. This means that as long as the first split line does not pause, it is the only split line in the schedule that is executing. The synchronization of split lines is in other words implicit and controlled through pausing. One does not have to worry about locking objects or introducing buffers between split lines. Rather, it will be appreciated that between pausing events, the current split line is the only one that is running.

In fact, one can absolutely avoid introducing its own thread management of any form into schedules. Doing so would undermine the model that serves as the foundation for schedules in accordance with the present invention.

Turning now to an aspect describing how one can implement the repeating stock quote client above using split lines:

```
Public Class StockQuotesRUs
    Public Sub GetStockQuotes(addr As Uri)
        Dim qteSrvceConnector As CtRepeatedRequestResponse = ...
        Dim value As String
        Split
            Line
                Dim cmd As String = ""
                Console.WriteLine("Enter ticker symbol: ")
                cmd = Console.ReadLine( )
                While cmd.ToLower <> "quit"
                    Send To qteSrvceConnector Request(cmd)
```

```
            Receive From qteSrvceConnector Response (Value)
            Console.WriteLine("Quote for "" & cmd & "": "&
    value)
            Console.WriteLine("Enter ticker symbol: ")
            cmd = Console.ReadLine( )
        End While
        Send To qteSrvceConnector ItsOver1( )
            Exit Split
        Line
            Receive From qteSrvceConnector ItsOver2( )
            Exit Split
        End Split
    End Sub
End Class
```

Note that the first split line is identical to the previously described implementation. Note that all that is done is that an "Exit Split" is added. This is another variant of the general "Exit" statement which terminates all the split lines of the surrounding "split" statement. The second split line waits for the "ItsOver2" message, which may never arrive. If it does not, then the first line will terminate the statement.

Orchestration Classes

Referring back to the distinction between regular schedules and those that appear in orchestration classes, if this class is present:

```
Public Class StockQuotesRUs
    Public Sub GetStockQuotes(addr As Uri)
    Dim qteSrvceConnector As CtRepeatedRequestResponse = ...
        Dim value As String
        Split
            Line
            Dim cmd As String = ""
            Console.WriteLine("Enter ticker symbol: ")
            cmd = Console.ReadLine( )
            While cmd.ToLower <> "quit"
                Send To qteSrvceConnector Request(cmd)
                Receive From qteSrvceConnector Response (Value)
                Console.WriteLine("Quote for "" & cmd & "": " &
    value)
                Console.WriteLine("Enter ticker symbol: ")
                cmd = Console.ReadLine( )
            End While
            Send To qteSrvceConnector ItsOver1( )
                Exit Split
            Line
                Receive From qteSrvceConnector ItsOver2( )
                Exit Split
        End Split
    End Sub
    Public Function GetStockQuote(addr As Uri, ticker As String) As
String
        Dim qteSrvceConnector As CtRepeatedRequestResponse = ...
        Send To qteSrvceConnector Request(ticker)
        Receive From qteSrvceConnector Response (Value As
String)
        Send To qteSrvceConnector ItsOver1( )
        Return value
        End Function
End Class
One might break it down this way:
Public Class StockQuotesRUs
    Public Sub GetStockQuotes(addr As Uri)
    Dim qteSrvceConnector As CtRepeatedRequestResponse = ...
        Dim value As String
        Split
            Line
            Dim cmd As String = ""
            Console.WriteLine("Enter ticker symbol: ")
            cmd = Console.ReadLine( )
            While cmd.ToLower <> "quit"
```

```
                Value = GetSingle(qteSrvceConnector, cmd)
                Console.WriteLine("Quote for "" & cmd & "": " &
    value)        Console.WriteLine("Enter ticker
    symbol: ")
                cmd = Console.ReadLine( )
            End While
            Send To qteSrvceConnector ItsOver1( )
                Exit Split
            Line
                Receive From qteSrvceConnector ItsOver2( )
                Exit Split
        End Split
    End Sub
    Public Function GetStockQuote(addr As Uri, ticker As String) As
String
        Dim qteSrvceConnector As CtRepeatedRequestResponse = ...
        Dim value As String = GetSingle(qteSrvceConnector, ticker)
        Send To qteSrvceConnector ItsOver1( )
        Return value
        End Function
        Private Function GetSingle(ctor As
CtRepeatedRequestResponse, _
                                                                    ticker
As String) As String
            Send To ctor Request(ticker)
            Receive From ctor Response (value As String)
        Return value
        End Function
End Class
```

The issue is that since each method has its own schedule, the "GetSingle" calls will block until done. In other words, inside the first split line, the call does not yield while waiting for the response message, and the second line does not get to execute. Essentially, it will be starved. If the Receive statement inside "GetSingle" could be coordinated with the one in the second line, then this problem could be alleviated. That is exactly what orchestration classes accomplish.

By simply changing the class declaration to:
Public Orchestration Class StockQuotesRUs
The desired behavior can be accomplished. In other words, the Receive statement in GetSingle yielding means that the split line yields and the second line may execute.

Waiting

Another basic operation inside a schedule is to wait for a set period of time. There is a whole class of long-running services where a significant portion of their time is spent delaying (commonly referred to as the "Procrastinator" pattern). These are often monitoring services, which typically listens to commands (e.g., like shutdown, add monitor, etc.) and at the same time can send a heart-beat signal or heart-beat polling request to other services. Referring now to these concepts, if for not other reason, to establish common terminology.

When designing some service/class of services that is/are expected to run for extended periods of time, one typically has to design in some sort of interface that allows other services to automatically figure out whether the service is still available or not, and do it proactively. One approach would be to have all clients who have trouble getting to the service send information to some central service, but that makes clients more complex than they need to be by adding use cases to their design, use cases that have nothing to do with the original purpose of the clients.

Rather, a monitoring service is created that keeps track of whether the first service is available by listening to its heart-beat, a message that is sent to the monitoring service with some frequency.

A typical design allows the monitoring service to ask the monitored service to send its heart-beat once, or to start sending it every N seconds, or tell the monitor how often it is prepared to send a heart-beat. The monitoring service can then either use a loop that waits for some time and sends a single-shot-heart-beat request, or ask the monitored service to regularly send a heart-beat.

In the latter situation, the monitoring service would use a "select Receive" and set the timeout interval to something a bit longer than the agreed-upon interval. If the heart-beat arrives, everything is fine, but if the statement times out, then that is an indication that something bad is going on, and the monitoring service could send out some form of alarm.

It will be appreciated that a more sophisticated implementation may piggy-back other information on the heart-beat message, allowing operators to get statistics on the long-running service.

If Wait were not explicitly supported as a statement in orchestration, introducing a fixed-time delay may have catastrophic consequences to the scalability of the application. One could have to rely on Thread.Sleep( ), which is an API in the .NET framework, but is completely inappropriate for the execution model of services, which requires that concurrency be managed by the runtime of the hosting environment. Calling Thread.Sleep( ) will tie up the current thread for the duration of the wait. For a service that loops calling Wait, this could be indefinitely.

In other words, such a service would allocate a thread all to itself. It is to be understood that this is in relation to a thread that goes unused most of the time (e.g., a typical monitoring thread might spend 100 microseconds doing work and then move on to sleeping for a couple of minutes. A thread that sleeps for one minute and works for 100 microseconds would spend 99.9998% of its time sleeping).

It is therefore important to account for the need to delay in the model. This is done with the "Wait" statement:
   Wait TimeSpan.FromMinutes(1)
To exemplify its use in a monitoring service (which does not listen to commands), below is a suitable schedule:

```
Service Client MonitorServiceAt (serviceRef As Uri)
   Schedule
      Dim monitoredService As HeartBeat = HeartBeat(serviceRef)
      Dim period As TimeSpan = TimeSpan.FromSeconds(30)
      Do
         Dim before As DateTime = DateTime.Now
         Send To monitoredService AreYouAlive( )
         Receive From monitoredService Pulse( )
         Wait (before + period – DateTime.Now)
      Loop
   End Schedule
End Service
```

Note that the system can compensate for the time it takes to execute the body of the loop. This is to make sure that the wait period is as close to the specified time as possible.

The Wait statement's operand can be of the type System.TimeSpan.

Dynamic Parallelism

Whereas the Split statement can allow a body of code to define, there is no way to use it to execute n lines of code in parallel. The case for such dynamic behavior is strong, and is supported in two different ways:
1. Split-For-Each statements
2. Split-Select-Receive statements The former has the same basic semantics as a For-Each statement, except it performs each iteration of the loop in parallel with all other iterations. In other words, there are as many parallel lines of execution as there are items in the collection that is iterated over. Once this number has been determined, additional lines cannot be added to the parallel statement. Split-For-Each has the same "join" rule as Split: when all iterations are finished, the Split-For-Each statement is finished.

By way of example:
   Split For Each itm As SKU In skuList
      Dim warehouse As WarehouseInventory= . . .
      Send To warehouse Allocate(itm)
      Receive From warehouse Confirmation
   Next The benefit of this over a normal For-Each containing such statements is that all Receive statements wait in parallel. The bigger the delay between send and receive, the more important it becomes to be able to do this.

"split-Select-Receive" can be used to dynamically start new lines of parallel execution in response to incoming messages. One variant depends on our understanding of multi-plexed conversations, but the simpler variant is one which helps us implement this contract (A, B, and C are all incoming messages):

```
S1:
   A → S1 And S2
   C → S3
S2:
   B → S3
S3:
   . . .
```

Here, the contract allows one to take any number of inter-leaved <A,B> sequences until getting a C, at which it waits for all Bs to come in. One would have a hard time implementing this using a Select-Receive statement in a loop, since each <A,B> sequence is handled independently of all others. One can, however, use a Split-Select-Receive:
   Split Select Receive
      Case Receive A( )
         Receive B( )
      Case Receive C( )
         Finish Split
   End Select Every time a line inside the statement yields, a new line can be created and the select statement can be executed for that new line. This means that the statement will never finish independently (e.g., there will always be a new, fresh line of execution to handle a next message). To exit the statement and still allow all already started lines to execute, some code within the statement could execute a "Finish Split" statement.

Note: in view of the preceding text, it will be understood that the idea of a line of execution does not refer to source code lines, but rather to "line of execution," e.g., a sequence of statements within a parallel program.

Exit

Several of the new versions of "Exit" have already been demonstrated above, but for ease of understanding, a recap of what they are and what they do is provided below:
   Exit Split
      This will terminate all yielding lines of the surrounding "split," "split-For-Each" or "split-Select-Receive" and transfer to the corresponding "End" or "Next" statement.
   Exit Line
      This will terminate the current line (whether static or dynamic), but not affect any others.

Filters

Message filters were not addressed when discussing "Receive" statements earlier. Similar to placing a clause on an exception handler to base the handler match on more than just the type of the exception, one can add a clause on a receive statement that allows one to accept or reject the message based on some special factors, such as its contents or global state.

Note that because the contract language has no means of specifying corresponding conditions, a schedule that uses filter expressions to reject messages can make sure that the contract is not violated in the process.

It is convenient to employ filters, particularly when one can receive more messages in some cases, but not in others. For example, Select Receive
Case Receive A(s1 As String) When s1="ACK", B(s2 As String)
"Handle situation
Case Receive A(s3 As String) When s3="OK"
"Handle situation
End Select This statement will accept message A only if the message parameter has the value "OK," otherwise it will receive A and B if the A message parameter has the value "ACK." If none of these situations are true, then the statement waits until they are. The filter may thus be invoked many times before the message is consumed, so it is vital that it be a true expression without side-effects.

Secondary Connectors

When a service is first started, as noted above, it is assigned a connector which can be used to send and receive messages without ever having to be mentioned explicitly. This connector is called the "primary" connector of the service. The primary connector is bound to the client connector that the first message was sent to the service on. It can always have an implementing perspective on its contract.

Just like any other client, when the activated service wishes to communicate with other services as a client, it could use a connector factory bound to some service address, create a connector from that factory and start sending messages. As stated above, all connectors created by connector factories have a using perspective.

What if the service wishes to allow other clients to initiate a conversation with it, whether on the same contract as the primary connector, or some other? The primary connector is already bound, therefore, sharing it is not an option. Besides, if one wants to implement some other contract, the primary connector is probably of no use, anyway.

The answer is that a secondary connector with an implementing perspective should be created. All implementing-perspective connectors in services are called secondary connectors. It will be understood that outside services, all connectors are equals—neither primary nor secondary.

Creating a new, secondary, implementing connector is illustrated below:
Dim SecondaryConnector As Implements RequestResponse=CtRequestResponse( )

Two things are noteworthy here:
1. One can use the "Implements" keyword as a type modifier in the variable declaration. This gives the declared variable an implementing perspective.
2. The actual connector object can be created by invoking the desired contract with no service reference. This is a rather odd use of a type name, perhaps, but it is the only way to create a secondary connector.

The "Implements" contract type modifier can be used wherever a connector variable can be created, including as a class or module member, or as a parameter to methods. Attempting to assign an object of one perspective to a variable of the opposite perspective can fail at compile time. Note that the rule for connector-variable assignment can be the exact opposite of the rule for connector-to-connector binding. In other words, connectors can only be assigned connectors of the same perspective, but they have to be bound to a connector of the opposing perspective.

Service Not Found

There are two ways that to discover that a service is not available. First, the TCP address might not be valid. In other words, the port has not been opened and the service is really not there. This problem is detected upon an attempt to send a first message to the service, and an exception can be raised immediately.

Secondly, the message can reach the destination, but the hosting environment does not recognize the service name or service instance. In this case, the schedule sending the message has moved on with life and throwing an exception is not meaningful.

The problem is instead dealt with by overriding a method in orchestration classes:
Protected Overrides Sub OtherSideNotThere(ByVal sref As String)
. . .
End Sub Timeouts When one sends an asynchronous message from one schedule to another, there is no guarantee that a response will be received. There are various reasons that this could happen, including, but not limited to, lower-level communication failure, or disagreement between client and server on what is expected. A contract cannot specify a maximum delay between two messages, so a service that does not respond to a request that the contract requires for two weeks has technically not broken the contract. Only if its schedule is terminated without first sending the message is the contract violated.

This presents a problem that one has to take into account when writing schedules for services and service clients. The only message a service can count on receiving is the first one, because that message arriving was the reason it was started in the first place. Service clients cannot even count on that much. Fortunately, VB orchestration provides suitable implementation tools.

There are two situations that require distinct treatment:
1. If a given message does not arrive, the computational process that the schedule embodies can be completely abandoned. Session timeouts are adequate for this situation, and are recommended, as it keeps the schedule code from being bloated.
2. If a given message does not arrive, the schedule can recover from it and proceed with default information, or try to resend the request, or contact some other service for the information. Select/Receive statements with timeout intervals are recommended for this situation. These situations have been discussed earlier:

Select Receive Within TimeSpan.FromMinutes(10)
Case Receive Response(str As String)

```
Case TimeOut:
End Select
```

Note that, as demonstrated above, a Select/Receive statement does not have to have multiple cases. A Receive statement is, in fact, a more efficiently implemented (but functionally equivalent) version of Select/Receive with a single case. In other words,
   Receive A ( . . . )
is equivalent to:

```
Select Receive
    Case Receive A (. . .)
End Select
```

Equipped with this realization, it should be clear that any time that a message is expected and does not arrive, one can handle it by adding a timeout interval to the receive statement.

In accordance with the present invention, a couple of alternatives, depending on the situation, are available when this happens. However, it should be noted that one cannot define any guidelines in general. Everything is entirely dependent on the problem being solved. For example:
  Wait a bit longer;
  If the response was a parameter-less "acknowledgement-style" message, then one can either decide to proceed under the assumption that the acknowledgement was negative (or perhaps positive, in some situations);
  If the response message was transporting back some non-critical data that one can proceed without, do so, perhaps with some default values for the data that did not arrive. Maybe a web service is looking for personalization data from a Passport-like service, but if there is none, the web service proceeds with limited personalization;
  Try to resend the message to the service that one was waiting for; and
  Find some other service that one can connect to, or another instance of the same service, to get the information.

The methods to do this will, of course, vary with the situation. Common to all, except the first bullet above, is that if the contract itself does not accommodate the fact that some messages might not arrive, in which case there is a huge problem. When a schedule exits, each connector created during its lifetime will be examined to verify whether the message exchange that has been done through it is completed or not. Any connector that "is not done" will be noted as violating its contract and an exception will be thrown. When one does not receive a message that it should have, there is an error somewhere and the runtime cannot simply ignore it, as it has no way of knowing how significant it is to the schedule. However, by discarding the connector that no message arrived on, a schedule informs the runtime that it should not validate the contract on that particular connector:

```
Select Receive Within TimeSpan.FromMilliseconds(100)
    Case Receive From Connector_1 Response(str As String)
    Case TimeOut:
        Connector_1.Discard( )
End Select
```

Discarding the connector, however, could also mean that no other actions can be taken on that connector. One cannot send to it, or receive messages from it. If attempted, an error will occur.

Note that timeout intervals on select statements do not set an upper limit for the total time that a group of statements take to execute, only the time that one statement waits for a message. To do the former, one can utilize a split and a wait statement:

```
Split
    Line
        Wait TimeSpan.FromMinutes(2)
        Exit Split
    Line
        " Some timed activity of multiple statements.
End Split
```

Since VB orchestration makes no claims of real-time behavior there is no guarantee that this will take no longer than the two minutes that were specified. Only when the second line reaches a pausing event will the split statement actually terminate and the statement following the "End Split" execute.

Interacting with Non-Schedule Code

There are circumstances where using send and receive statements for asynchronous programming may not be the right solution. In some circumstances, the single-threaded blocking nature of schedules gets in the way of an elegant solution, or maybe there is a need to have some UI code that just is not, by nature, schedule-driven.

The good news is that even in these situations it is easy to write thin layers of code that translate something such as a button-press event into a message to a service or service client. In short, asynchronous programming goes very well together with event-based graphical UI programming.

To realize this bridge between the two paradigms—event-based vs. schedule-based—VB orchestration allow non-schedule code to send and map incoming messages to events. Messages can therefore be exchanged back and forth without a schedule and its blocking semantics.

Each message in a contract results in an event being added to the type. Since methods and events cannot be overloaded in .NET, the event name is the name of the message with the String "Event" directly appended to it. The method has the exact same name as the message.

By way of example:

```
Private Sub Foo( )
    Dim Connector_1 As CtRequestResponse = ...
    AddHandler Connector_1.ResponseEvent, AddressOf ResponseHandler
    Send To Connector_1 Request("Gimme!")
    ...
End Sub
Private Sub ResponseHandler(str As String)
    ...
End Sub
```

In the sample application that will be examined below, message exchanges will be employed in this manner particularly related to graphical UI interaction.

Graphical User Interfaces

Win32-based graphical user interfaces have special needs when it comes to what threads are used to do certain things, such as providing a control with new data to display. Not all controls have this need, but some do, and one has to accommodate that. Both schedules and individual connectors can be attached to a UI thread so that all messages that are received in the schedule or on a connector are received in the context of specific UI thread.

This feature is easy to use, but should be limited to situations where it is really required. It will be appreciated that forcing schedule code onto a single thread will limit the opportunity for concurrency and is therefore a potential performance bottleneck.

Dim connector As Contract_1= . . .
Connector.SetControl(Form1)

The second statement will make sure that once it returns, all messages received on that connector will arrive on the form's owning thread. Note that one can do this also on the primary connector of a service (this is one of the few reasonable occasions to refer to the primary connector explicitly).

Primary.SetControl(Form1)

Most likely, though, services and service clients will not be calling UI code directly but send messages to the forms that contain them, which means that most likely, it is non-schedule connectors for which it will make sense to set the controlling thread.

Following is an example when using "setControl( )":
Select Receive
Case Receive From connector1 A( ), Receive From connector2 B( )
End Select Unless connector1 and connector2 are both bound to the same owning thread, the message reception will be non-deterministic (as regards the thread) in this case. It will be appreciated that the thread information can be pulled from either connector in the case. Therefore, it is important to make sure that all connectors in a case are bound to the same owning thread, or that the schedule is bound to the owning thread.

Operable Computing Environment

Figure 7:
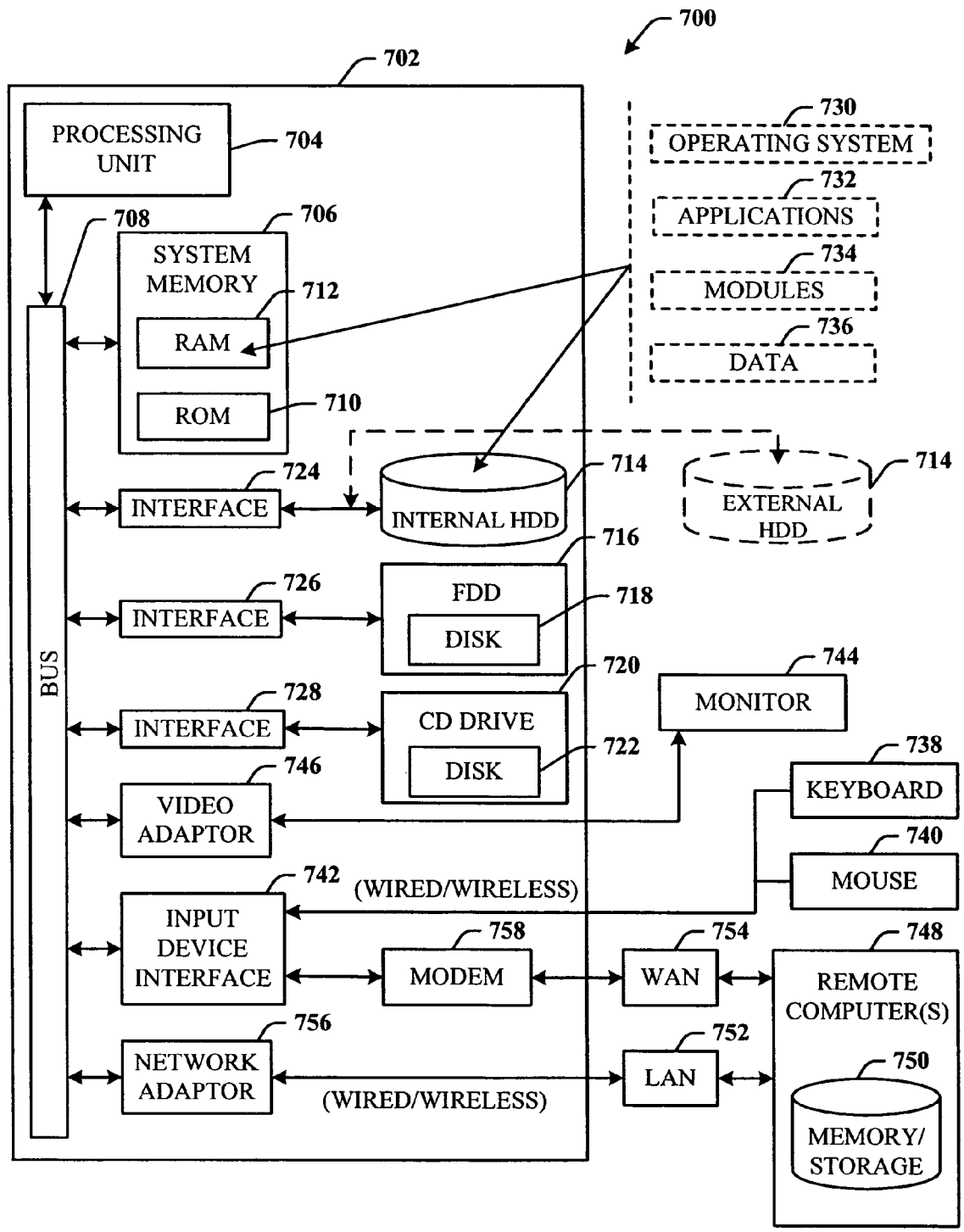
FIG. 7 illustrates a block diagram of a computer operable to execute the disclosed architecture.

Referring now to FIG. 7, there is illustrated a block diagram of a computer operable to execute the disclosed architecture. In order to provide additional context for various aspects of the present invention, FIG. 7 and the following discussion are intended to provide a brief, general description of a suitable computing environment 700 in which the various aspects of the present invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 7, there is illustrated an exemplary environment 700 for implementing various aspects of the invention that includes a computer 702, the computer 702 including a processing unit 704, a system memory 706 and a system bus 708. The system bus 708 couples system components including, but not limited to, the system memory 706 to the processing unit 704. The processing unit 704 can be any of various commercially available processors. Dual microprocessors and other multi-processor architectures may also be employed as the processing unit 704.

The system bus 708 can be any of several types of bus structure that may further interconnect to a memory bus (with or without a memory controller), a peripheral bus, and a local bus using any of a variety of commercially available bus architectures. The system memory 706 includes read only memory (ROM) 710 and random access memory (RAM) 712. A basic input/output system (BIOS) is stored in a non-volatile memory 710 such as ROM, EPROM, EEPROM, which BIOS contains the basic routines that help to transfer information between elements within the computer 702, such as during start-up. The RAM 712 can also include a high-speed RAM such as static RAM for caching data.

The computer 702 further includes an internal hard disk drive (HDD) 714 (e.g., EIDE, SATA), which internal hard disk drive 714 may also be configured for external use in a suitable chassis (not shown), a magnetic floppy disk drive (FDD) 716, (e.g., to read from or write to a removable diskette 718) and an optical disk drive 720, (e.g., reading a CD-ROM disk 722 or, to read from or write to other high capacity optical media such as the DVD). The hard disk drive 714, magnetic disk drive 716 and optical disk drive 720 can be connected to the system bus 708 by a hard disk drive interface 724, a magnetic disk drive interface 726 and an optical drive interface 728, respectively. The interface 724 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 702, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the present invention.

A number of program modules can be stored in the drives and RAM 712, including an operating system 730, one or more application programs 732, other program modules 734 and program data 736. All or portions of the operating system, applications, modules, and/or data can also be cached in the RAM 712.

It is appreciated that the present invention can be implemented with various commercially available operating systems or combinations of operating systems.

A user can enter commands and information into the computer 702 through one or more wired/wireless input devices, e.g., a keyboard 738 and a pointing device, such as a mouse 740. Other input devices (not shown) may include a microphone, an IR remote control, a joystick, a game pad, a stylus pen, touch screen, or the like. These and other input devices are often connected to the processing unit 704 through an input device interface 742 that is coupled to the system bus 708, but can be connected by other interfaces, such as a parallel port, an IEEE 1394 serial port, a game port, a USB port, an IR interface, etc.

A monitor 744 or other type of display device is also connected to the system bus 708 via an interface, such as a video adapter 746. In addition to the monitor 744, a computer typically includes other peripheral output devices (not shown), such as speakers, printers etc.

The computer 702 may operate in a networked environment using logical connections via wired and/or wireless communications to one or more remote computers, such as a remote computer(s) 748. The remote computer(s) 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory storage device 750 is illustrated. The logical connections depicted include wired/wireless connectivity to a local area network (LAN) 752 and/or larger networks, e.g., a wide area network (WAN) 754. Such LAN and WAN networking environments are commonplace in offices, and companies, and facilitate enterprise-wide computer networks, such as intranets, all of which may connect to a global communication network, e.g., the Internet.

When used in a LAN networking environment, the computer 702 is connected to the local network 752 through a wired and/or wireless communication network interface or adapter 756. The adaptor 756 may facilitate wired or wireless communication to the LAN 752, which may also include a wireless access point disposed thereon for communicating with the wireless adaptor 756. When used in a WAN networking environment, the computer 702 can include a modem 758, or is connected to a communications server on the LAN, or has other means for establishing communications over the WAN 754, such as by way of the Internet. The modem 758, which can be internal or external and a wired or wireless device, is connected to the system bus 708 via the serial port interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with conventional network or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, with an 11 Mbps (802.11b) or 54 Mbps (802.11a) data rate or with products that contain both bands (dual band), so the networks can provide real-world performance similar to the basic 10BaseT wired Ethernet networks used in many offices.

Figure 8:
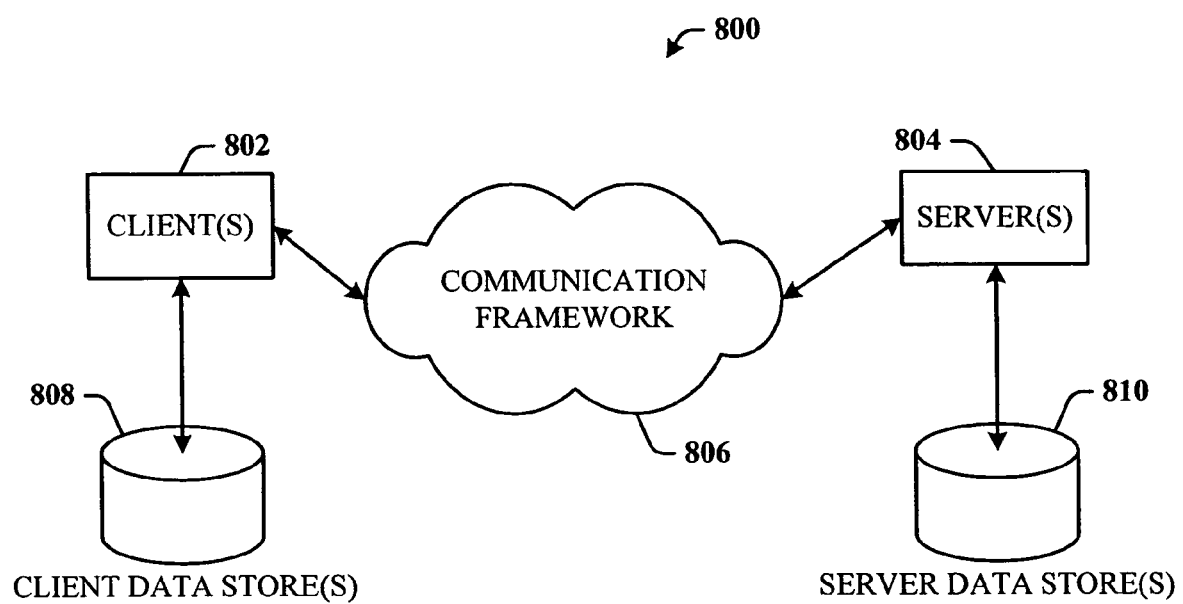
FIG. 8 illustrates a schematic block diagram of an exemplary computing environment in accordance with the present invention.

Referring now to FIG. 8, there is illustrated a schematic block diagram of an exemplary computing environment 800 in accordance with the present invention. The system 800 includes one or more client(s) 802. The client(s) 802 can be hardware and/or software (e.g., threads, processes, computing devices). The client(s) 802 can house cookie(s) and/or associated contextual information by employing the present invention, for example. The system 800 also includes one or more server(s) 804. The server(s) 804 can also be hardware and/or software (e.g., threads, processes, computing devices). The servers 804 can house threads to perform transformations by employing the present invention, for example. One possible communication between a client 802 and a server 804 can be in the form of a data packet adapted to be transmitted between two or more computer processes. The data packet may include a cookie and/or associated contextual information, for example. The system 800 includes a communication framework 806 (e.g., a global communication network such as the Internet) that can be employed to facilitate communications between the client(s) 802 and the server(s) 804.

Communications can be facilitated via a wired (including optical fiber) and/or wireless technology. The client(s) 802 are operatively connected to one or more client data store(s) 808 that can be employed to store information local to the client(s) 802 (e.g., cookie(s) and/or associated contextual information). Similarly, the server(s) 804 are operatively connected to one or more server data store(s) 810 that can be employed to store information local to the servers 804.

Appendix A describes various aspects of the subject invention, and this appendix is to be considered part of the detailed specification of this application.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for implementing a service concurrency model for services constructed using an object-oriented language through use of language extensions in a message-oriented language, the language extensions extending a functionality of the services that execute in an object oriented environment so as to unify the object-oriented and message-oriented languages through message passing between a plurality of services, the system comprising:
    a memory; and
    a processor, operatively coupled to the memory, the processor executing computer executable components comprising:
        a plurality of services constructed using the object oriented language;
        a contract component that facilitates communication among the plurality of services, the contract component defined as interface declarations for asynchronous message passing between the plurality of services, the contract component being represented in source code in each of the plurality of services as express send and receive operations, the contract component including:
            a message component, the message component declaring a set of messages that can be used as an alphabet for patterns used to establish formal protocol definitions for a communication protocol; and
            a protocol component, the protocol component describing allowable sequences of message exchange in accordance with formal protocol definitions for a communication protocol;
        an orchestration component, the orchestration component configured to interpret the contract component and to facilitate the handling of a plurality of messages and a plurality of message targets in the plurality of services, the orchestration component including:
            a compiler component, the compiler component configured to implement a compilation algorithm to break the source code of the services down into pieces to allow parallel waits to occur without blocking thread context of the plurality of services, the compilation algorithm breaking apart the source code that could block a thread to allow one of: multiple points in the source code waiting in parallel or a thread context continuing with a different computation; and
        wherein the orchestration component directs the compiler component to generate a schedule for at least a subset of the plurality of services in accordance with the contract component, the schedule facilitating parallelism of the subset of services by allowing services in the subset to wait in parallel with other services in the subset.

2. The system of claim 1, the protocol component comprising:
    a pattern component that identifies an order that specifies a valid sequence of the asynchronous message component.

3. The system of claim 1, wherein the contract component includes at least one method call component and a pattern component that identifies an order that specifies a valid sequence of the at least one method call component.

4. The system of claim 3, wherein the valid sequence identifies a yield point in the execution of at least one of a method call in the at least one method call component and allows execution of the other of the at least one of a method call to proceed past the yielded method call.

5. The system of claim 1 further comprising a contract extension component that extends the contract component to add at least one additional message to the contract component.

6. The system of claim 5, wherein the contract extension component extends the contract component to add at least one additional state to the contract component.

7. The system of claim 5, wherein the contract extension component extends the contract component to add at least one additional trigger to the contract component.

8. The system of claim 1, wherein a service from the subset of services waits in parallel independently of the other services so as to prevent blocking the execution of other services.

9. At a computer system including a processor and system memory, a method being executed by the computer system for implementing concurrency among a plurality of services represented in object-oriented code, the method comprising:
    declaring a contract external to the plurality of services, the contract for synchronizing information sent between target services within the plurality of services to implement concurrency for the target services, the contract declaring:
        a plurality of messages for synchronizing information between target services; and
        message ordering between a subset of the target services; and
    enforcing the message ordering in accordance with the external contract among the subset of target services, the enforcement of the message ordering orchestrating asynchronized information among the subset of target services to facilitate target services concurrency, including:
        a first service in the subset of target services sending a message to a second service in the subset of target services, the message including a payload indentifying an implementation schedule to organize the plurality of services in a parallel manner to accomplish sharing and synchronization of the data for the external contract, the schedule allows for waiting for more than one asynchronous message in parallel thereby preventing the block of thread context of services the payload indicating when the first and second service are to wait without blocking other services;
        the second service receiving the message from the first service; and
        the second service decompiling the message in order to employ the payload and implement the schedule for the contract.

10. The method of claim 9, wherein declaring a contract comprises declaring at least one asynchronous message.

11. The method of claim 10, wherein declaring a contract comprises specifying a pattern for execution of at least one asynchronous message.

12. The method of claim 10, wherein enforcing the contract comprises specifying a trigger for execution of the at least one asynchronous message.

13. The method of claim 10, wherein enforcing the contract comprises:
   dissecting the contract to facilitate generation of a schedule;
   partitioning the dissected contract to generate the schedule; and
   communicating the schedule to a runtime algorithm.

14. The method of claim 9, wherein enforcing the contract comprises declaring a method call and specifying a pattern for invocation of the method call.

15. The method of claim 9, wherein the enforcing the contract comprises identifying a contract extension that expands the existing contract.

16. The method of claim 15, wherein identifying the contract extension comprises adding at least one additional message to the contract.

17. The method of claim 15, wherein identifying the contract extension comprises adding at least one additional state to the contract.

18. The method of claim 15, wherein identifying the contract extension comprises adding at least one additional trigger to the contract.

19. At a computer system including a processor and system memory, a method being executed by the computer system for employing an orchestration component to manage communication between a plurality of services, the method comprising:
   declaring a contract external to the plurality of services, declaring the external contract including defining a plurality of messages and defining a protocol of the external contract for implementing concurrency among the plurality of services, the plurality of messages including more than one of an asynchronous message with data;
   implementing the external contract for communicating among a plurality of services, each of the services includes a thread context;
   compiling the external contract to generate a schedule as a function of asynchronous messaging and the protocol of the contract for implementing concurrency among the plurality of services; and
   using the generated schedule to organize the plurality of services in a parallel manner to accomplish sharing and synchronization of the data, the schedule allows for waiting for more than one asynchronous message in parallel thereby preventing the block of thread context of services, including:
      sending a message to a service in the plurality of services, the message including a payload identifying the schedule, the payload indicating when the service is wait without blocking other services; and
      the service decompiling the message in order to employ the payload and implement the schedule to wait without blocking other services.

20. The method of claim 19 further comprising communicating the schedule to a runtime algorithm.

* * * * *